United States Patent
Trumper et al.

(10) Patent No.: US 11,368,116 B2
(45) Date of Patent: Jun. 21, 2022

(54) DIPOLE INFERIOR PERMANENT MAGNET SLICE ROTORS

(71) Applicant: Massachusetts Institute of Technology, Cambridge, MA (US)

(72) Inventors: David L. Trumper, Plaistow, NH (US); Benjamin Weinreb, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/331,712

(22) Filed: May 27, 2021

(65) Prior Publication Data
US 2022/0029567 A1 Jan. 27, 2022

Related U.S. Application Data

(60) Provisional application No. 63/056,826, filed on Jul. 27, 2020.

(51) Int. Cl.
  *H02P 21/00* (2016.01)
  *H02P 21/22* (2016.01)
  *H02P 21/18* (2016.01)

(52) U.S. Cl.
  CPC .............. *H02P 21/22* (2016.02); *H02P 21/18* (2016.02); *H02P 2207/05* (2013.01)

(58) Field of Classification Search
  CPC ................................ H02P 21/22; H02P 21/18
  USPC ..................................................... 318/400.02
  See application file for complete search history.

(56) References Cited

U.S. PATENT DOCUMENTS

| 8,193,672 | B2* | 6/2012 | Oh ......................... H02K 1/276 310/216.106 |
| 9,520,752 | B1* | 12/2016 | Laldin ................... H02K 1/2753 |
| 2021/0115929 | A1* | 4/2021 | Nakazawa .............. F16C 32/04 |

OTHER PUBLICATIONS

Ensior "Cardiac Devices, Ension" Retrieved from https://www.ension.com/portfolio/cardiac-devices.html on May 26, 2021; 2 pages.
Boehm, et al., "Sensors for Magnetic Bearings;" IEEE Transactions on Magnetics, vol. 29, No. 6; Nov. 1993; 3 pages.
Duesterhoeft, et al., "Determination of Instantaneous Currents and Voltages by Means of Alpha, Beta, and Zero Components;" Transactions of the American Institute of Electrical Engineers, vol. 70, Issue: 2; Jul. 1951; 8 pages.

(Continued)

*Primary Examiner* — Erick D Glass
(74) *Attorney, Agent, or Firm* — Daly, Crowley, Mofford & Durkee, LLP

(57) ABSTRACT

A motor system can include a bearingless stator having a plurality of magnetic windings including rotation windings and suspension windings; a dipole interior permanent magnet (IPM) rotor positioned within the stator, the rotor having a plurality of permanent magnets disposed within a cylindrical structure; one or more position sensors to measure radial and angular position of the rotor; and a controller configured to receive measurements from the one or more position sensors and to generate current commands for the stator to excite the rotation windings to generate torque and to excite the suspension windings to stabilize the rotor within the stator.

15 Claims, 13 Drawing Sheets

(56) References Cited

OTHER PUBLICATIONS

Faiz, et al., "Performance Verification of Saturated IPM Bearingless Motors Considering Magnetic Pull Variation;" 2016 IEEE International Power Electronics and Motion Control Conference (PEMC); Sep. 25, 2016; 7 pages.
Gaffney, et al., "Extracorporeal Life Support;" The BMJ; Retrieved from https://www.bmj.com/content/341/bmj.c5317; Nov. 10, 2010; 12 pages.
Gruber, et al., "Bearingless Slice Motors: General Overview and the Special Case of Novel Magnet-Free Rotors;" Innovative Small Drives and Micro-Motor Systems; Sep. 2013; 6 pages.
Hamer, et al., "Sensing and Commutation of a Spherical Permanent Magnetic Dipole Actuator;" 34th Annual Meeting of the American Society for Precision Engineering (ASPE); Oct. 2019; 6 pages.
Honeywell, "Hall Effect Sensing and Application;" Micro Switch Sensing and Control; Jan. 1998; 126 pages.
Jaatinen, et al., "Improving of bearingless 6-slot IPM motor radial force characteristics using rotor skew;" 2017 IEEE International Electric Machines and Drives Conference (IEMDC); May 21, 2017; 7 pages.
Lion Precision, "Comparing Capacitive and Eddy-Current Sensors;" Retrieved from https://www.lionprecision.com/comparing-capacitive-and-eddy-current-sensors on May 26, 2021; 14 pages.
Lovelace, "Optimization of a Magnetically Saturable Interior Permanent-Magnet Synchronous Machine Drive;" Retrieved from https://dspace.mit.edu/handle/1721.1/9085; Jun. 22, 2000; 263 pages.
Lu, "Electromagnetically-Driven Ultra-Fast Tool Servos for Diamond Turning;" Retrieved from https://ocw.mit.edu/ans7870/2/2.14/s14/MIT2_14S14_XDLU_PhD_Thesis.pdf; Sep. 2005; 173 pages.
Matsuzaki, et al., "Operational Characteristics of an IPM-Type Bearingless Motor With 2-Pole Motor Windings and 4-Pole Suspension Windings;" IEEE Transactions on Industry Applications, vol. 53, No. 6; Nov./Dec. 2017; 10 pages.
Meeker, Finite Element Method Magnetics: OctaveFEMM User's Manual; Retrieved from http://www.femm.info/Archives/doc/octavefemm.pdf; Jan. 30, 2018; 63 pages.
Meeker, Finite Element Method Magnetics Version 4.2 User's Manual; Retrieved from https://www.femm.info/Archives/doc/manual42.pdf; Jan. 30, 2018; 161 pages.
Noh, et al., "Homopolar Bearingless Slice Motor With Flux-Biasing Halbach Arrays;" IEEE Transactions on Industrial Electronics, vol. 67, No. 9; Sep. 2020; 10 pages.
Noh, et al., "Hysteresis Bearingless Slice Motors With Homopolar Flux-Biasing;" IEEE/ASME Transactions on Mechatronics, vol. 22, No. 5; Oct. 2017; 11 pages.
Noh, et al., "Homopolar-biased Hysteresis Bearingless Slice Motors;" The 15$^{th}$ International Symposium on Magnetic Bearings; Aug. 3, 2016; 5 pages.
Noh, et al., "Homopolar Bearingless Slice Motors Driving Reluctance Rotors;" 16th International Symposium on Magnetic Bearings; Aug. 2018; 5 pages.
Noh, "Homopolar Bearingless Slice Motors with Magnet-free Rotors for Extracorporeal Life Support;" Retrieved from https://dspace.mit.edu/handle/1721.1/120259; Sep. 2018; 262 pages.
Noh, et al, "Low-cost Eddy-current Position Sensing for Bearingless Motor Suspension Control;" 2017 IEEE International Electric Machines and Drives Conference (IEMDC); May 21, 2017; 6 pages.
Okada, et al., "Levitation and Torque Control of Internal Permanent Magnet Type Bearingless Motor;" IEEE Transactions on Control Systems Technology, vol. 4, No. 5; Sep. 1996; 7 pages.

Ooshima, et al., "An Improved Control Method of Buried-Type IPM Bearingless Motors Considering Magnetic Saturation and Magnetic Pull Variation;" IEEE Transactions on Energy Conversion, vol. 19, No. 3; Sep. 2004; 7 pages.
Park, "Two-Reaction Theory of Synchronous Machines, Generalized Method of Analysis—Part I;" Transactions of the American Institute of Electrical Engineers, vol. 48, Issue: 3; Jul. 1929; 12 pages.
Rahman, et al., "Impacts of Interior Permanent Magnet Machine Technology for Electric Vehicles;" 2012 IEEE International Electric Vehicle Conference; Mar. 4, 2012; 6 pages.
Schiferl, et al., "Power Capability of Salient Pole Permanent Magnet Synchronous Motors in Variable Speed Drive Applications;" IEEE Transactions on Industry Applications, vol. 26, Issue 1; Jan. 1990; 9 pages.
Schöbb, et al., "Principle and Application of a Bearingless Slice Motor;" Fifth International Symposium on Magnetic Bearings; Aug. 1996; 6 pages.
Sun, et al., Optimal Design and Performance Analysis for Interior Composite-Rotor Bearingless Permanent Magnet Synchronous Motors; Retrieved from https://ieeexplore.ieee.org/stamp/stamp.jsp?arnumber=8590705; Jan. 23, 2019; 10 pages.
Takemoto, et al., "Synchronous Reluctance Type Bearingless Motors with Multi-flux Barriers;" 2007 Power Conversion Conference—Nagoya; Apr. 2, 2007; 6 pages.
Takemoto, et al., "A Deeply-Buried Permanent Magnet Bearingless Motor with 2-pole Motor Windings and 4-pole Suspension Windings;" 38th IAS Annual Meeting on Conference Record of the Industry Applications Conference; Oct. 12, 2003; 8 pages.
Texas Instruments, "LDC1101 1.8-V High-Resolution, High-Speed Inductance-to-Digital Converter;" Retrieved from https://www.ti.com/lit/ds/symlink/ldc1101.pdf?ts=1622828893008&ref_url=https%253A%252F%252Fwww.google.com%252F; Feb. 2016; 55 pages.
Texas Instruments, "Optimizing L Measurement Resolution for the LDC161x and LDC1101;" Retrieved from https://www.ti.com/lit/an/snoa944/snoa944.pdf?ts=1622829070225&ref_url=https%253A%252F%252Fwww.google.com%252F; Feb. 2016; 9 pages.
Varedan Technologies, LA-210 (LA-200) LA-415 (LA-407) LA-525 (LA-508-25) Technical Reference Manual; Retrieved from https://www.manualshelf.com/manual/varedan-technologies/la-series/specifications-english.html; Oct. 6, 2004; 43 pages.
Varedan Technologies, "Sizing a Linear Amplifier Driving a Rotary Brushless Motor;" Retrieved from https://varedan.com/wp-content/uploads/2018/02/4083-42-006-RevC.pdf; Jan. 2021; 8 pages.
Weinreb, et al., "Noise, Resolution, and Sampling Rate Characterization of a Low Cost Eddy-Current Position Sensing System for Bearingless Motor Suspension Control;" 34th Annual Meeting of the American Society for Precision Engineering (ASPE); Oct. 2019; 5 pages.
Weinreb, et al., "A Novel Position Sensing System for Bearingless Motors;" Department of Mechanical Engineering, American Society for Precision Engineering (ASPE) Spring topical meeting; May 7, 2020; 6 pages.
Weinreb, et al., "A Novel Sensing System for Permanent Magnet Bearingless Slice Motors;" American Society for Precision Engineering (ASPE) Spring Topical Meeting; May 7, 2020; 23 pages.
Zhou, "Magnetically Levitated Hysteresis Motor Driven Linear Stage for In-Vacuum Transportation Tasks;" Retrieved from https://dspace.mit.edu/handle/1721.1/122142; Jun. 2019; 246 pages.
Weinreb, et al., "Design and implementation of a novel interior permanent magnet bearinngless slice motor;" Retrieved from https://ieeexplore.ieee.org/document/9432752; IEEE Transactions on Industry Applications; May 17, 2021; 10pages.

\* cited by examiner

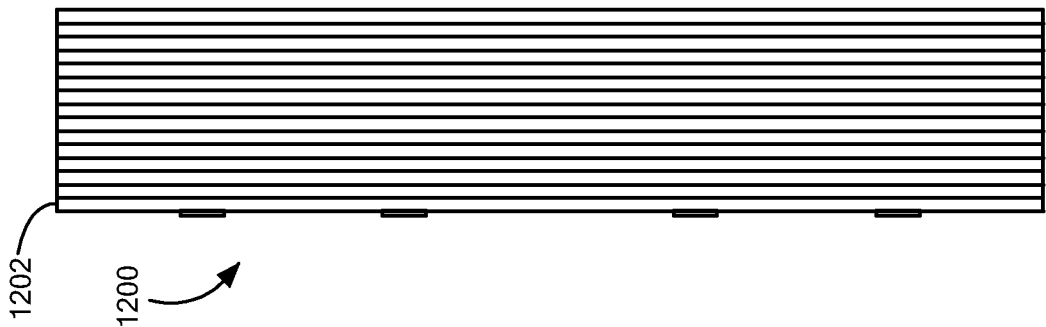
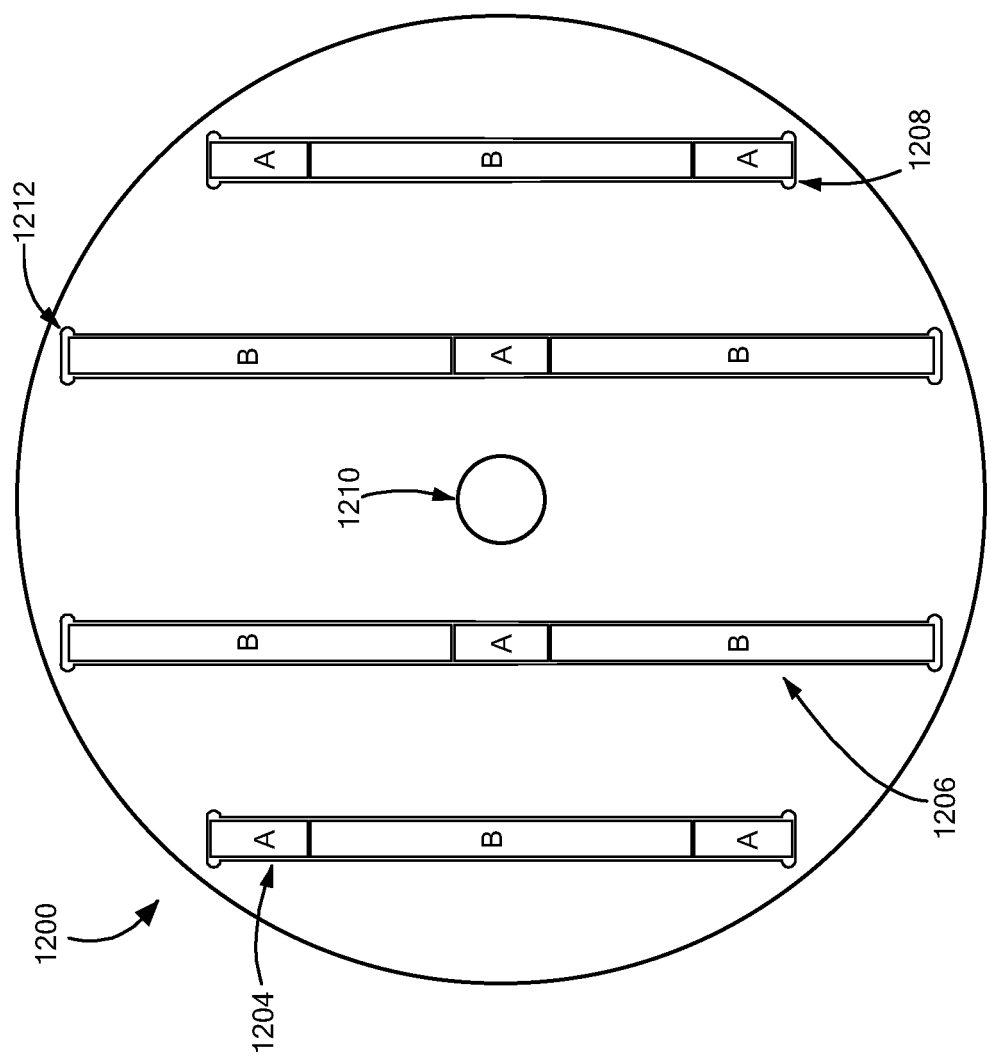

DIPOLE INFERIOR PERMANENT MAGNET SLICE ROTORS

CROSS-REFERENCE TO RELATED APPLICATIONS

This application claims the benefit under 35 U.S.C. § 119 of provisional patent application No. 63/056,826 filed on Jul. 27, 2020, which is hereby incorporated by reference herein in its entirety.

STATEMENT REGARDING FEDERALLY SPONSORED RESEARCH

This invention was made with Government support under Grant No. R41 HL134455 awarded by the National Institutes of Health (NIH). The Government has certain rights in the invention.

BACKGROUND

As is known in the art, a salient pole dipole interior permanent (IPM) magnet slice rotor is one component of a magnetically levitated motor system, also referred to as a bearingless motor. Bearingless motor systems can include a stator, rotor, one or more sensors, power electronics, and a control system. The stator in a bearingless motor can have both torque generating windings and force generating windings. When excited with current, the force generating windings levitate the rotor within the stator and the torque generating windings rotate the rotor in a substantially non-contact manner. This non-contact rotation capability eliminates the need for mechanical bearings and is useful for applications which require low friction, long operational life, or high cleanliness/purity.

Bearingless motor variants can be categorized by the rotor type, which essentially dictates the motor driving principle. Different bearingless motor rotor topologies include permanent magnet rotors, salient teeth reluctance rotors, flux barrier reluctance rotors, interior permanent magnet rotors, and induction rotors.

SUMMARY

It is appreciated herein that some prior art rotor designs may increase either the force or torque capacities of bearingless motors, but not both. For example, existing designs that use thin permanent magnets buried just beneath the rotor outer diameter can achieve higher force capacity, but have relatively low torque capacity.

It is also appreciated herein that prior art rotors designed to enable both high force and torque capacity may be complex and expensive to manufacture. For example, existing designs that have permanent magnets buried deeply within the rotor, creating low reluctance paths for the suspension flux, may enable both high force and torque capacity. However, such designs have asymmetric suspension dynamics and are complex to manufacture. There exist four-pole bearingless IPM designs that utilize a six-pole suspension flux which results in a better balance of force and torque capacity and symmetric dynamics. Thus, there exists is a need for improved bearingless IPM rotors that utilize a dipole design.

Described herein are embodiments of rotors and related bearingless motor systems suitable for use in non-contact pumping applications and other applications which require low friction, long operational life, or high cleanliness/purity.

Disclosed embodiments—which may be referred to as "salient pole dipole interior permanent (IPM) slice rotors"—provide performance and manufacturing advantages over prior art bearingless slice rotor designs. Disclosed embodiments address four issues that exist in prior art bearingless motors: force vs. torque trade-off, highly asymmetric suspension dynamics, lack of hybrid torque production capability, and complex and expensive manufacturing. Disclosed embodiments do not exhibit the trade-off between force and torque capacity to the extent that is prevalent in prior art bearingless motors. Disclosed embodiments can be optimized for symmetric suspension dynamics which allows the use of less complex control and commutation algorithms compared to prior art designs. While conventional (i.e., non-bearingless) IPM rotors may contain salient poles, prior art IPM rotors designed for bearingless motors generally do not. With disclosed embodiments, the rotor salient poles enable hybrid torque production, in which both permanent magnet torque and reluctance torque are produced. The salient poles also enable flux weakening operation in which the motor can be operated above its rated speed in a constant power regime. Disclosed rotor designs are relatively simple and low-cost to manufacture as compared to prior art designs.

Disclosed embodiments can be used in pumping applications which benefit from non-contact operation. One example is blood pumping for extracorporeal life support (ECLS) applications. A conventional rotary blood pump for ECLS applications requires a blood seal to separate the blood from the mechanical bearings. The sliding friction that occurs between the blood seal and shaft can shear and damage the blood. Utilizing a bearingless motor to drive a blood pump eliminates the need for mechanical bearings and a blood seal, thus reducing the risk of blood damage due to friction.

According to one aspect of the disclosure, a motor system can include: a bearingless stator having a plurality of magnetic windings including rotation windings and suspension windings; a dipole interior permanent magnet (IPM) rotor positioned within the stator, the rotor having a plurality of permanent magnets disposed within a cylindrical structure; one or more position sensors to measure radial and angular position of the rotor; a controller configured to receive measurements from the one or more position sensors and to generate current commands for the stator; and power electronics to receive and amplify the current commands to excite the rotation windings to generate torque and to excite the suspension windings to stabilize the rotor within the stator.

In some embodiments, the controller may include: a suspension control unit configured to generate first current commands for the stator which result in forces on the rotor to stabilize radial degrees of freedom and keep the rotor levitated in a center of the stator bore; and a speed control unit configured to generate second current commands for the stator to rotate the rotor. In some embodiments, the plurality of magnetic windings of the stator may produce four-pole suspension flux and two-pole rotation flux when excited. In some embodiments, the permanent magnets can be arranged to generate a dipole magnetic flux pattern in an air gap between the rotor and stator. In some embodiments, the cylindrical structure of the rotor can have a plurality of cut outs to receive the plurality of permanent magnets. In some embodiments, the permanent magnets can be encapsulated within the cylindrical structure of the rotor. In some embodiments, the cylindrical structure of the rotor may include steel.

According to another aspect of the disclosure, a method can include: obtaining one or more measurements of radial and angular position of a dipole interior permanent magnet (IPM) rotor using one or more position sensors, the rotor positioned within a bearingless stator having a plurality of magnetic windings including rotation windings and suspension windings, the rotor having a plurality of permanent magnets disposed within a cylindrical structure; generating current commands for the stator based on the one or more measurements; exciting the rotation windings using the current commands to generate torque; and exciting the suspension windings using the current commands to stabilize the rotor within the stator.

In some embodiments, the method can include amplifying the current commands using power electronics. In some embodiments, the method may include: generating first current commands for the stator which result in forces on the rotor to stabilize radial degrees of freedom and keep the rotor levitated in a center of the stator bore; and generating second current commands for the stator to rotate the rotor. In some embodiments, the plurality of magnetic windings of the stator can produce four-pole suspension flux and two-pole rotation flux when excited. In some embodiments, the permanent magnets may be arranged to generate a dipole magnetic flux pattern in an air gap between the rotor and stator. In some embodiments, the cylindrical structure of the rotor may have a plurality of cut outs to receive the plurality of permanent magnets. In some embodiments, the permanent magnets may be encapsulated within the cylindrical structure of the rotor. In some embodiments, the cylindrical structure of the rotor may include steel.

BRIEF DESCRIPTION OF THE DRAWINGS

The manner of making and using the disclosed subject matter may be appreciated by reference to the detailed description in connection with the drawings, in which like reference numerals identify like elements.

FIG. 12A is a top view of a segmented dipole IPM rotor, according to embodiments of the present disclosure.

FIG. 12B is a side view of a segmented dipole IPM rotor of FIG. 12A.

The drawings are not necessarily to scale, or inclusive of all elements of a system, emphasis instead generally being placed upon illustrating the concepts, structures, and techniques sought to be protected herein.

DETAILED DESCRIPTION

Figure 1:
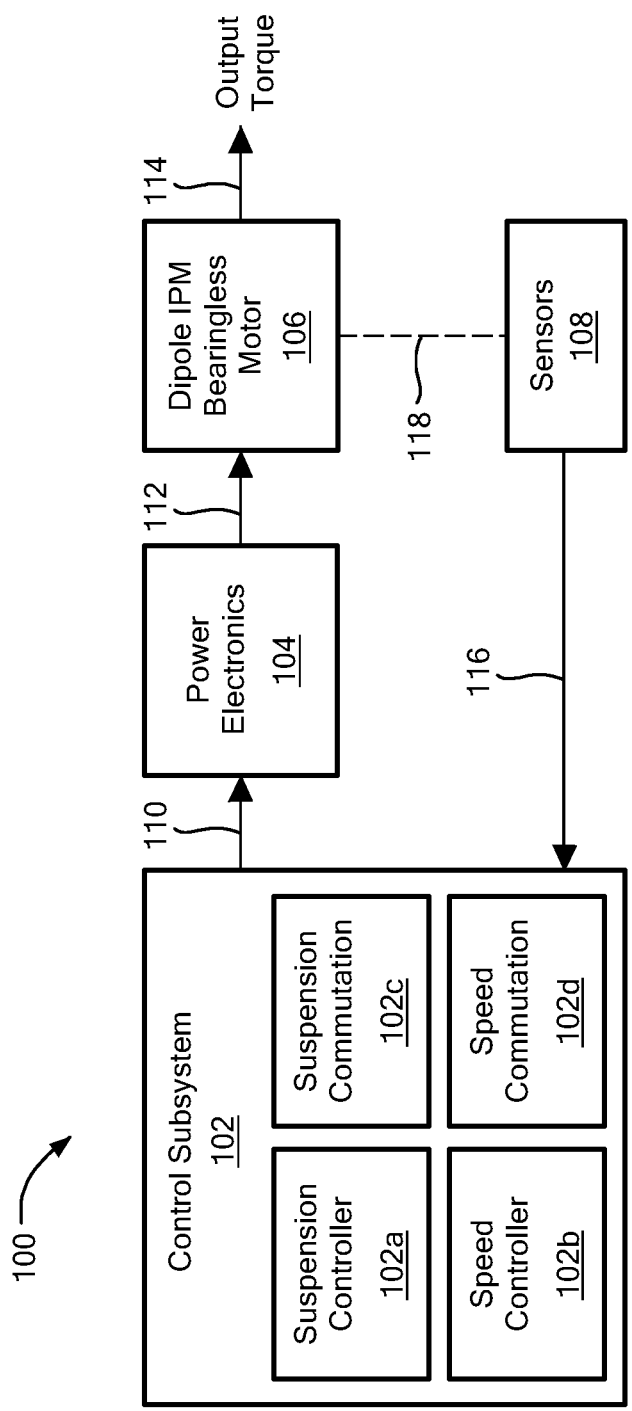
FIG. 1 is a block diagram of a bearingless motor system having a dipole interior permanent magnet (IPM) slice rotor, according to embodiments of the present disclosure.

Referring to FIG. 1, an illustrative bearingless motor system 100 can include a control subsystem 102, power electronics 104, a dipole IPM bearingless motor 106, and one or more sensors 108.

Motor 106 can include a stator and a dipole IPM slice rotor, embodiments of which are described below in the context of various other figures. The stator can be provided with force generating windings (or "suspension windings") to suspend the rotor within the stator and the torque generating windings (or "rotation windings") to rotate the rotor in a substantially non-contact manner. The suspension windings can be configured to provide a 4-pole suspension flux, and the rotation windings can be configured to generate a 2-pole rotation flux, according to various embodiments.

Control subsystem 102 can include a suspension (or "force") controller 102a, a speed (or "torque") controller 102b, a suspension (or "force") commutation unit 102c, and a speed (or "torque") commutation unit 102d. As used herein, the term "unit" refers to a collection of hardware and/or software configured to perform and execute the processes, steps, or other functionality described in conjunction therewith. Controllers 102a, 102b can generate and send control signals 110 to the power electronics 104, which in turn drive the suspension and rotation windings of the motor 106. Commutation units 102c, 102d can be configured to perform transformations between the various reference frames as described in detail below. By transforming between frames, the control algorithms can be simplified and the X and Y force generation can be decoupled. In some embodiments, control signals 110 can include voltage commands, e.g., suspension control voltage commands and speed control voltage commands.

Control subsystem 102 can include a collection of hardware and/or software configured to perform and execute the processes, steps, or other functionality described in conjunction therewith. For example, the suspension control and commutation controllers 102a, 102c can be configured to calculate stator current commands (i.e., control signals 110) to stabilize the radial degrees of freedom and keep the rotor levitated in the center, or substantially the center, of the stator bore. The speed control and commutation controllers 102b, 102d can be configured to calculate stator current commands (i.e., control signals 110) to rotate the rotor. Examples of suspension and speed control and commutation algorithms that can be implemented within control subsystem 102 are described below in the context of FIGS. 6 and 7, respectively.

Power electronics 104 can include one or more amplifiers to amplify the control signals 110 to drive suspension and rotation windings within the motor 106. In more detail, the amplifiers can scale the input voltage commands and output current to the motor windings. In some embodiments, power electronics 104 can include a pair of three-phase linear amplifiers to drive the motor windings. In some embodiments, the linear amplifiers, sometimes referred to as "linear transconductance amplifiers," can be rated for 200 W continuous and 400 W peak output power. In some embodiments, the power amplifiers are configured with a gain of 1 A/V. That is, with a 1V input voltage command, the amplifier will supply 1 amp out to the winding.

Controllers 102a, 102b may receive sensor information 116 from the one or more sensors 108 and use the sensor information 116 to control the motor 106 in a closed-loop manner. Sensors 108 may be positioned near the motor 106 such that they can measure the rotor radial and angular position. In some embodiments, sensors 108 may be integrated within the stator. In some embodiments, sensors 108 can include one or more optical sensors to measure the rotor radial position and one or more Hall elements to measure the rotor angular position. In some embodiments, a pair of Hall element ring printed circuit boards (PCBs) can be located on the stator so as to be positioned above and below the rotor during operation.

Figure 2:
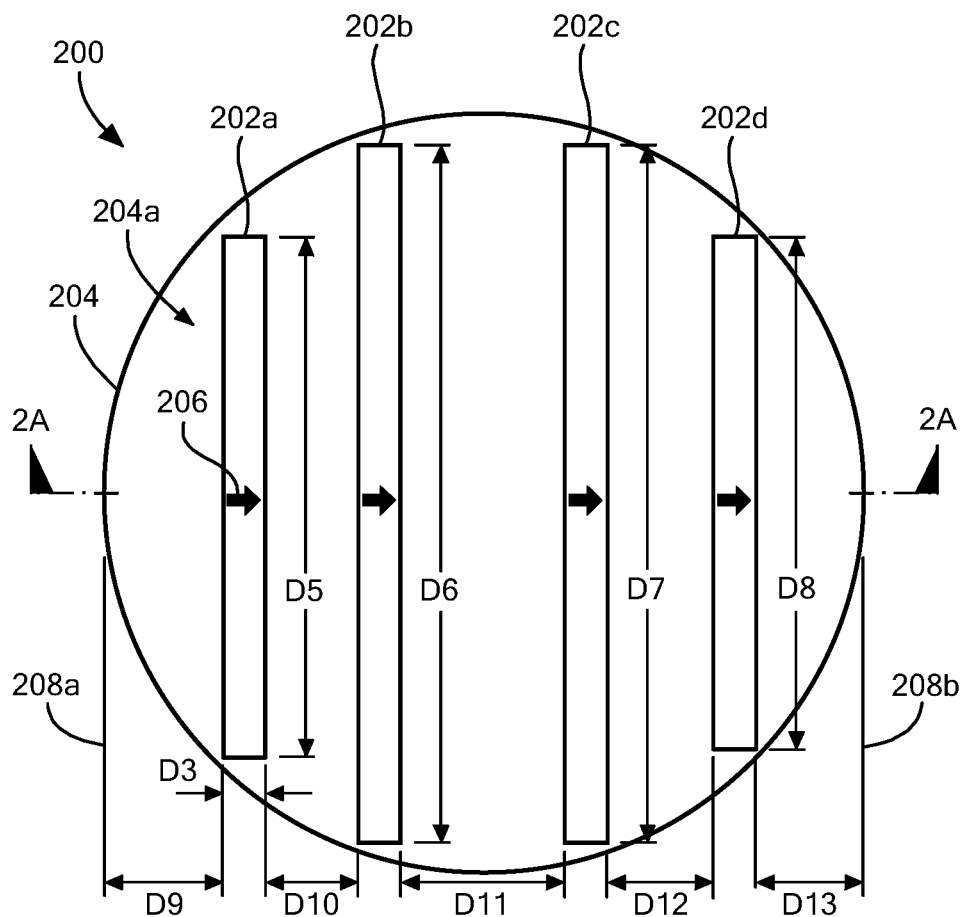
FIG. 2 is a top view of a segmented dipole IPM rotor, according to embodiments of the present disclosure.
Figure 2A:
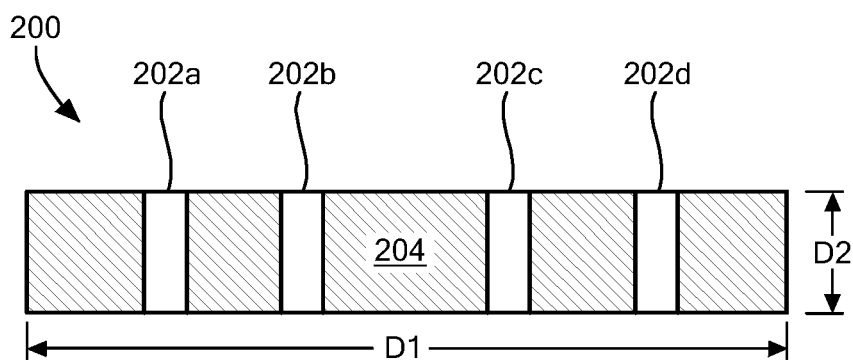
FIG. 2A is a cross-sectional view of the rotor shown in FIG. 2.

Turning to FIGS. 2 and 2A, a dipole IPM rotor 200 can include of a cylindrical or disc-shaped structure 204 with a pattern of cut outs into which a plurality of permanent magnets 202a, 202b, 202c, 202d (202 generally) are positioned. The general rotor design illustrated in FIGS. 2 and 2A is referred to herein as a "segmented" dipole IPM rotor, which is one type of salient pole dipole IPM slice rotor sought to be protected herein. In the embodiment of FIGS. 2 and 2A, the segmented dipole IPM rotor 200 include four (4) magnets 202a-202d, however other numbers of magnets can be used.

The permanent magnets 202 can be arranged to generate a dipole (equivalently, two-pole, or having a single north and south pole) magnetic flux pattern in the air gap between the rotor and stator that approximates a sinusoidal waveform. In FIG. 2, the north poles of the permanent magnets 202 are indicated by the center arrows (e.g., arrow 206). In some embodiments, magnets 202 can be provided as Neodymium iron boron (NdFeB) permanent magnets and, more particularly, as nickel-coated N48 grade NdFeB magnets. The magnets 202 can be shaped as rectangular parallelepipeds and arranged substantially parallel to each other along their long edges, as shown.

The magnets 202 can be fully encapsulated within the interior of the rotor structure 204, which can be comprised of a material that has good magnetic permeability, such as M-19 steel or another type of electrical steel. The magnet arrangement is such that there exists a pattern of salient poles, or areas of low magnetic reluctance, around the rotor circumference.

The rotor structure 204 can have a diameter D1 and a height D2. In some embodiments, the ratio D1:D2 can be about 5:1. The magnets 202 can have a width D3 and a height D4 that may be nominally the same as the rotor height D2. The lengths of the magnets 202 can vary. For example, a first magnet 202a can have a length D5, a second magnet 202b can have a length D6 greater than D5, a third magnet 202c can have a length D7 approximately equal to D5, and a fourth magnet 202d can have a length D8 approximately equal to D5. The first magnet 202a can be spaced a distance D9 from a line 208a parallel to the first magnet 202a and tangent to the rotor structure 204. The first and second magnets 202a, 202b can be spaced part by a distance D10. The second and third magnets 202b, 202c can be spaced part by a distance D11. The third and fourth magnets 202c, 202d can be spaced part by a distance D12. The fourth magnet 202d can be spaced a distance D13 from a line 208b parallel to the fourth magnet 202d and tangent to the rotor structure 204.

In one example, D1 is about 50 mm, D2 is about 10 mm, D3 is about 2 mm, D4 is about 10 mm, D5 is about 30 mm, D6 is about 45 mm, D7 is about 45 mm, D8 is about 30 mm, D9 is about 6.43 mm, D10 is about 8.29 mm, D11 is about 12.57 mm, D12 is about 8.29 mm, and/or D13 is about 6.43 mm. It should be understood that these dimensions could be made arbitrarily small/large depending on the overall system requirements. Additionally, while the aspect ratio of the components would not need to be identical, the dimensions would need to be scaled together to some extent.

It is appreciated herein that arranging the rotor magnets 202 to generate a dipole magnetic flux pattern in the air gap between the rotor and stator that approximates a sinusoidal waveform results in decoupled x-axis and y-axis force dynamics and allows for identical, single input single output (SISO) suspension controllers to be implemented along each axis.

The segmented dipole IPM design shown in FIGS. 2 and 2A is merely one example of a salient pole dipole IPM rotor. Other examples of such rotors are described below in the context of FIGS. 8 to 10.

Figure 3A:
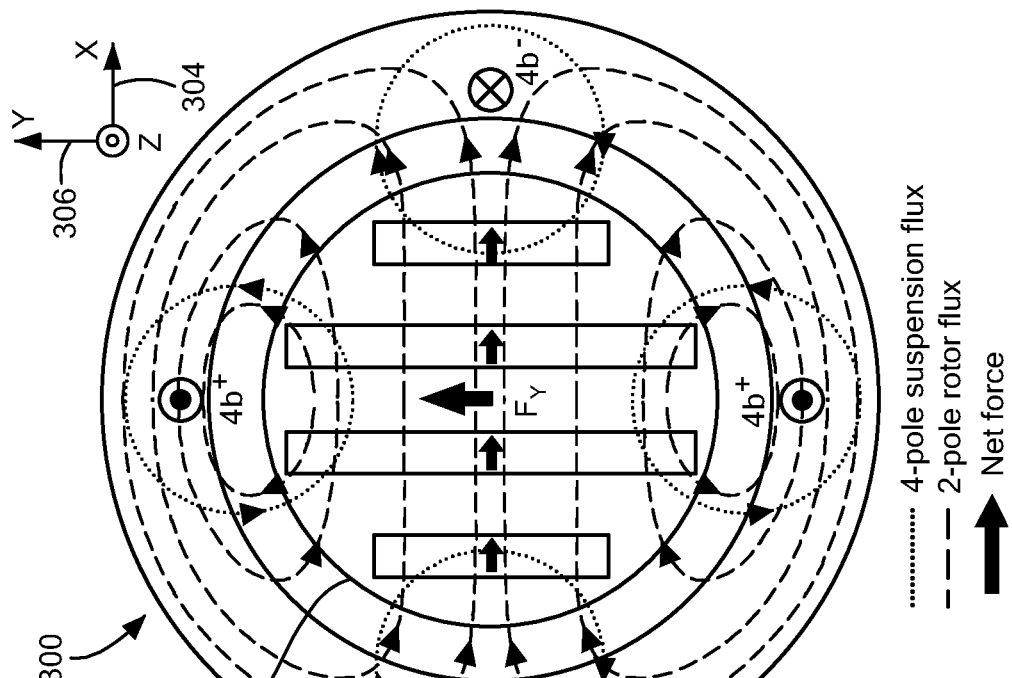
FIG. 3A is schematic diagram illustrating X force generation with a two-pole IPM rotor and four-pole suspension winding, according to embodiments of the present disclosure.
Figure 3B:
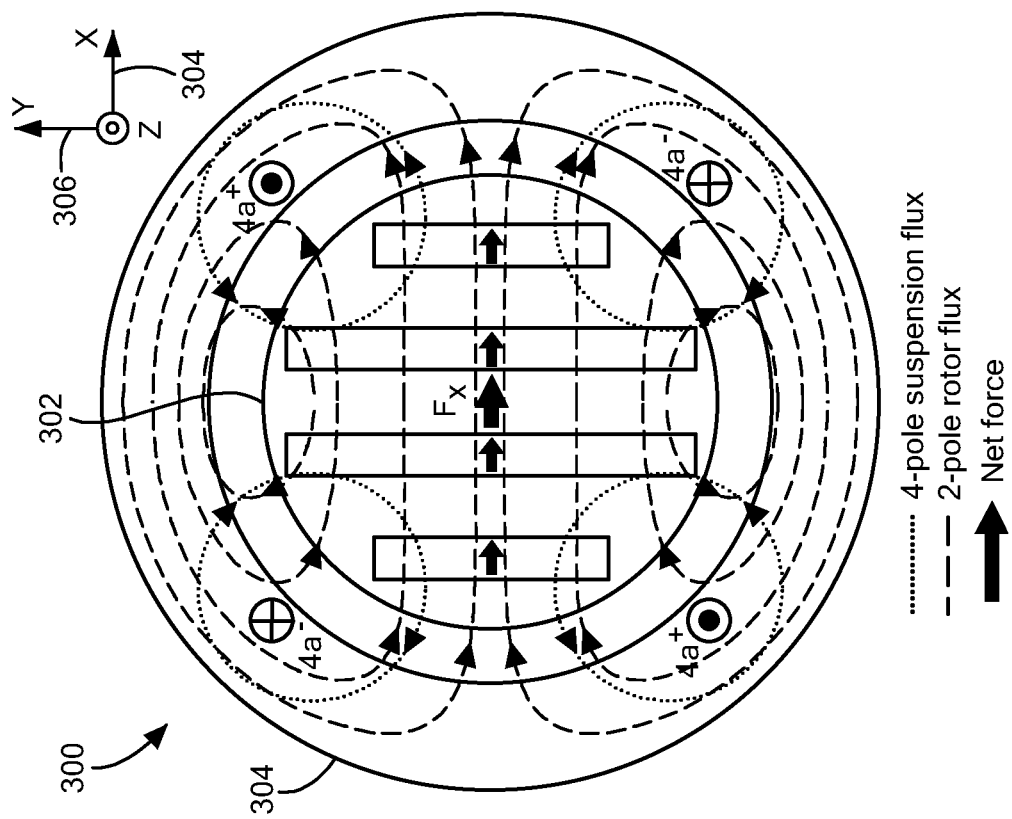
FIG. 3B is schematic diagram illustrating Y force generation with a two-pole IPM rotor and four-pole suspension winding, according to embodiments of the present disclosure.

Turning to FIGS. 3A and 3B, a bearingless motor 300 can include a segmented dipole IPM rotor 302 installed in a central bore of a stator 304. The rotor 302 can be the same as or similar to rotor 200 described above on the context of FIG. 2. The stator 304 can include a steel structure and coils of magnet wire terminated into sets of windings (e.g., suspension windings and rotation windings). The rotor 302 may be dynamically unstable in the radial degrees of freedom (i.e., in the plane of the magnetization). The stator windings can be excited with current to generate four-pole magnetic flux patterns in the air gap, as shown. The interaction of the stator generated four-pole magnetic flux pattern with the rotor dipole flux generates radial (i.e., suspension) forces on the rotor. While not illustrated here, it should be understood that the interaction of the stator generated two-pole flux with the rotor dipole flux generates torque on the rotor. By properly commanding the stator currents, arbitrary radial forces and torques can be generated. FIG. 3A illustrates how this flux interaction can generate force along an X axis 306 and FIG. 3B illustrates how this flux interaction can generate force along a Y axis 308. While the embodiment of FIGS. 3A and 3B show a four-pole suspension flux.

A consideration in designing a bearingless IPM slice motor is the decoupling of the force and torque generation. Decoupling of force and torque is desirable as it simplifies the control and commutation algorithms required to operate the motor. Producing radial forces on a $n_{p_r}$ pole rotor requires an $n_{p_s} = n_{p_r} \pm 2$ suspension control flux. From this, it follows that the rotation flux should intentionally violate this principle so as to not produce radial forces in addition to torque.

That is, the rotation control flux pole number $n_{p_{rc}}$ should satisfy $n_{p_{rc}} \neq n_{p_r} \pm 2$ for decoupled force and torque operation. Thus, in some embodiments, $n_{p_{rc}}$ can be set equal to $n_{p_r}$, as is typical for synchronous machine torque production.

However, torque/force coupling can still occur even if an IPM bearingless slice motor is designed to satisfy the conditions $n_{p_{rc}} = n_{p_r}$ and $n_{p_s} = n_{p_r} \pm 2$. The decoupling principle may only hold under the assumption there are no additional harmonics in the flux distributions. For example, consider a non-ideal two pole ($n_{p_r} = 2$, $p_r = n_{p_r}/2 = 1$) rotor with higher harmonic content in the bias flux density pattern. This non-ideal bias flux distribution can be expressed as:

$$B_r = B_1 \cos\theta + \sum_{k=2}^{N} (a_k \cos k p_r \theta + b_k \sin k p_r \theta). \quad (1)$$

where $\theta$ is angle from the rotor's axis of magnetization (the direct axis) in a rotor-fixed frame.

Then, consider the interaction of this non-ideal rotor flux with an ideal two-pole rotation control flux given by:

$$B_{rc} = B_3 \sin\theta. \quad (2)$$

In this case, even though the rotation control flux has no higher harmonic content, radial forces may be generated due to the interaction of the two-pole rotation control flux with the four-pole component of the non-ideal rotor bias flux. In a practical bearingless IPM implementation, there will be some non-ideal higher harmonic content in the rotor flux, rotation control flux, and suspension control flux. These non-ideal harmonics arise due to the rotor saliency, stator saliency, magnet configuration, and imperfect construction of the system. To minimize the effect of force and torque coupling, these higher harmonics should be reduced and ideally minimized.

Higher harmonic content in the suspension control fluxes and rotor bias flux can also complicate the force commutation by mutually coupling the X and Y forces. In the ideal cases, the simple force commutation algorithm shown in Equation (3) only decouples the X and Y forces assuming the rotor flux pattern and suspension flux patterns are ideal sinusoids with no higher harmonic content:

$$\begin{bmatrix} F_{4a} \\ F_{4b} \end{bmatrix} = \begin{bmatrix} \cos 2\phi & \sin 2\phi \\ \sin 2\phi & -\cos 2\phi \end{bmatrix} \begin{bmatrix} F_x \\ F_y \end{bmatrix}. \quad (3)$$

where the rotor angle $\phi$ is the angle between the stator-fixed X-axis and the rotor axis of magnetization (the direct axis).

Here, the required suspension winding forces $F_{4a}$ and $F_{4b}$ are computed as a function of the rotor angle $\phi$ and the desired radial forces $F_x$ and $F_y$. More complex decoupling algorithms may be required for non-ideal flux distributions.

Another source of potential force/torque coupling can occur due to the relatively high armature reaction flux that is characteristic of IPM motors. In a synchronous motor, the flux produced by the rotation windings in the air gap is referred to armature reaction flux. In surface permanent magnet (SPM) machines, armature reaction flux is typically small compared to the flux generated by the rotor permanent magnets because the permanent magnets create a high reluctance path for the stator flux. As a result, the armature reaction flux does not significantly affect the net air gap flux distribution, which is dominated by rotor bias flux pattern. In IPM motors, the armature reaction flux can be comparable in magnitude to the rotor flux due to the low reluctance paths created by the salient poles. As a result, the armature reaction flux can distort the net air gap flux distribution. This distortion of the air gap flux due to armature reaction is especially problematic in a bearingless motor as it can cause issues with the force commutation. The simple force commutation algorithm as described in Equation (3) computes the required suspension windings forces as a function of the rotor angle $\phi$. This assumes that the net air gap flux distribution is aligned with the rotor, which is not necessarily the case when the armature reaction flux has distorted the field. A force commutation algorithm for bearingless motors that accounts for the armature reaction flux distortion of the air gap field is shown in Equation (4). This algorithm assumes that the air gap flux distortion can be modeled as a phase shift in the $n_{p_r}$ pole rotor flux distribution. This may provide a good assumption considering that armature reaction flux is also a $n_{p_r}$ pole distribution.

$$\begin{bmatrix} F_{4a} \\ F_{4b} \end{bmatrix} = \begin{bmatrix} \cos 2(\phi + \theta_f) & \sin 2(\phi + \theta_f) \\ \sin 2(\phi + \theta_f) & -\cos 2(\phi + \theta_f) \end{bmatrix} \begin{bmatrix} F_x \\ F_y \end{bmatrix}. \quad (4)$$

Equations (3) and (4) are described in Akira Chiba, Tadishi Fukao, Osamu Ichikawa, Msahide Oshima, Masatsugu Takemoto, and David G. Dorrell, "Magnetic bearings and bearingless drives," Elsevier/Newnes, Amsterdam London, 2005. OCLC: 179729376, which is hereby incorporated by reference entirety Here, the additional term $\theta_f$ is the phase angle shift in the net air gap flux caused by the armature reaction flux. This term is a function of the direct and quadrature axis rotation current commands $I_d$ and $I_q$, the motor geometry, and the motor magnetic and electrical properties. Thus, executing this commutation algorithm requires that $\theta_f$ is recomputed at each time step as a function of instantaneous direct and quadrature axis currents commands and motor parameters.

Another design consideration in developing a bearingless IPM motor is the tradeoff between force and torque capacity. In general, thick magnets are desirable to increase the motor's PM torque capacity. However, thicker magnets result in a higher reluctance path for the suspension control flux, thus reducing the force capacity.

The impact of this tradeoff can be reduced by considering the magnetic configuration of the rotor and stator. The saliency of an IPM rotor lends an advantage to the $n_{p_s} = n_{p_r} + 2$ configuration over the $n_{p_s} = n_{p_r} - 2$ configuration in terms of force capacity.

FIGS. 3A and 3B illustrate the suspension force generation for a two-pole ($n_{p_r} = 2$) IPM rotor with four pole suspension winding $n_{p_s} = n_{p_r} + 2 = 4$. Here, it can be seen that rather than pass through the entire rotor and all of the buried magnets, the four-pole suspension flux substantially flows through local paths. Some of these local flux paths go through one magnet, some through two, and others through only the rotor steel. These lower reluctance flux paths for the suspension flux can result in a higher force capacity than for this configuration as compared to the four-pole rotor configuration. This can also reduce the impact of the trade-off between force and torque capacity, as the magnet thickness has less of an effect on the local suspension flux paths.

It is appreciated here that, with the two-pole rotor configuration of FIGS. 3A and 3B, the flux paths for X and Y force generation may be different. Thus, the X and Y force constants and force capacity may not be identical. Advantageously, rotor embodiments disclosed herein do not require accommodating this asymmetry in control or commutation. However asymmetric force generation can be accommodated in commutation if desired or necessary in some embodiments.

Figure 4:
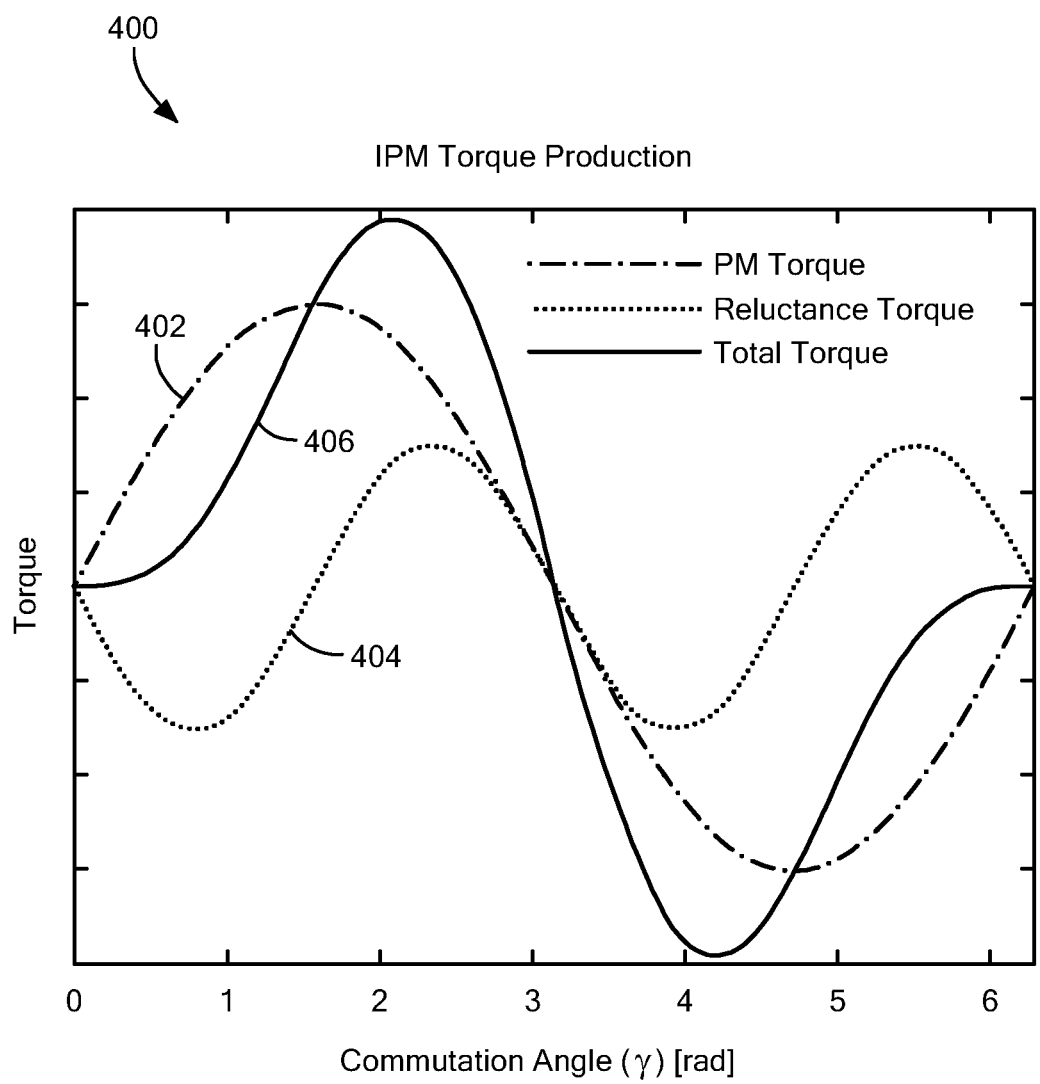
FIG. 4 is a plot showing an example of torque-commutation angle relationships in a bearingless motor system having an IPM rotor.

Referring to FIG. 4, the arrangement of salient poles and permanent magnets in disclosed embodiments of a segmented dipole IPM rotor can enable hybrid torque production. An illustrative plot 400 shows permanent magnet torque 402, reluctance torque 404, and total torque 406 as a function of commutation angle for an example IPM machine. It can be seen that permanent magnet (PM) torque 402 varies sinusoidally with the commutation angle once per electrical cycle.

For convenience in both commutation and analysis, a rotor-fixed dq-frame can be defined that includes a direct-axis (d-axis) oriented along the rotor axis of magnetization, and quadrature-axis (q-axis) that oriented 90 electrical degrees advanced of the direct axis. In the case of the dipole rotor, the electrical and mechanical angles are equivalent and thus the q-axis is also 90 mechanical degrees advanced of the direct axis.

The peak PM torque 402 occurs at $\gamma=\pi/2$, which is a pure q-axis current. This is typical of non-salient synchronous PM machines. The reluctance torque 404 varies sinusoidally twice per cycle, as is typical of reluctance machines. The peak reluctance torque occurs at $\gamma=3\pi/4$ and $\gamma=7\pi/4$. The peak total torque 406, which is the sum of the PM and reluctance torque, occurs in the range of $\pi/2 \leq \gamma \leq 3\pi/4$. This range corresponds to a positive q-axis current and a negative d-axis current.

Figure 5B:
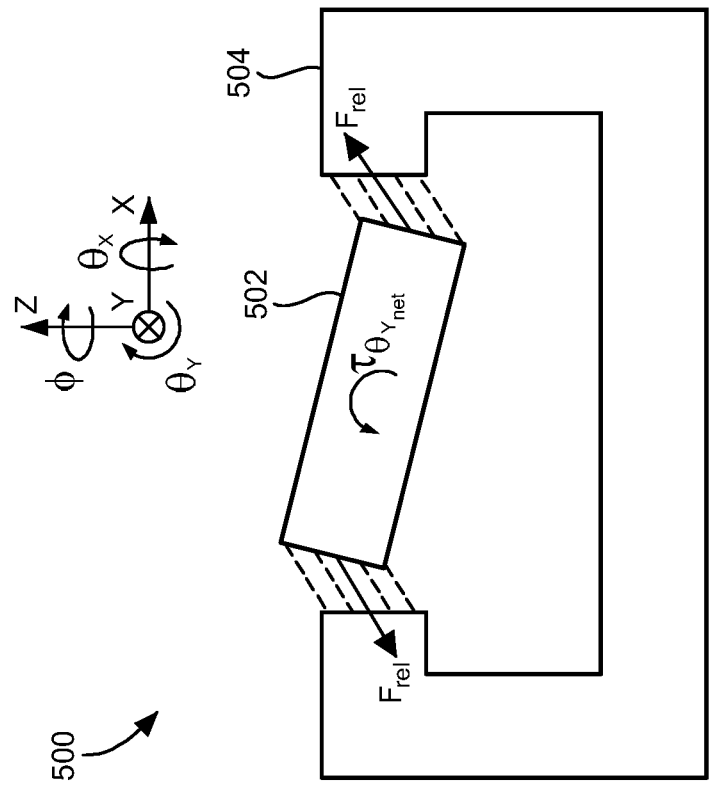
FIGS. 5A and 5B are diagrams illustrating passively stable degrees of freedom in a dipole IPM slice rotor, according to embodiments of the present disclosure.
Figure 5A:
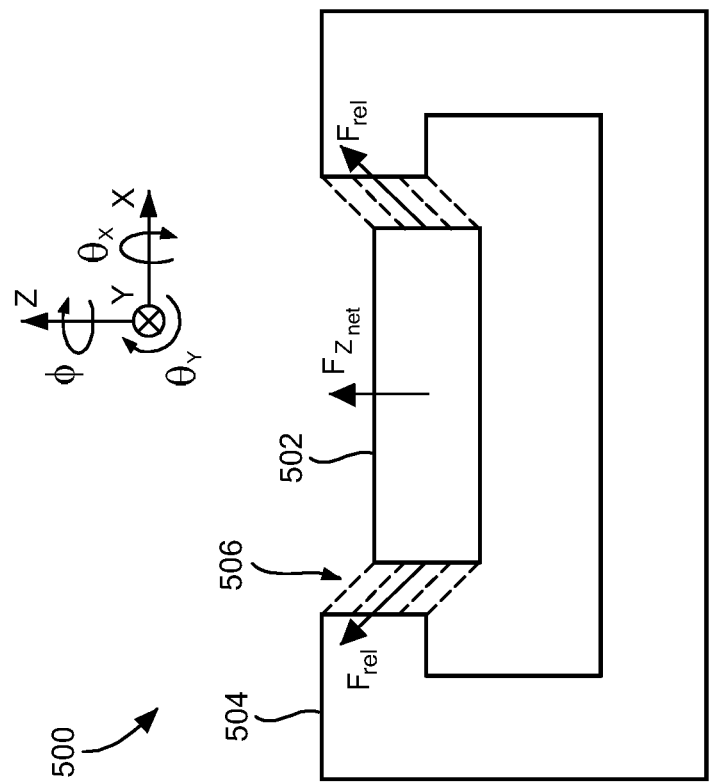

Turning to FIGS. 5A and 5B, an advantage of the bearingless slice motor designs disclosed herein over other bearingless motor topologies is that three degrees of freedom ($\theta_X$, $\theta_Y$, and Z) can be passively stable. This reduces the cost and complexity of the system, as each degree of freedom that must be actively stabilized requires windings, power electronics, sensors, and control algorithms.

The passive stiffness operation is illustrated by a motor 500 having a rotor 502 and a stator 504. In FIG. 5A, a passive restoring force is generated when the rotor 502 is perturbed in the Z direction. This can arise due to reluctance forces. In general, reluctance forces act to reduce the reluctance path for the rotor bias flux, shown as dashed lines in FIGS. 5A and 5B (e.g., dashed lines 506 in FIG. 5A). The lowest reluctance path may occur when the rotor 502 is centered in its nominal position. In FIG. 5B, a passive restoring torque can be generated when the rotor 502 is perturbed in the $\theta_Y$ direction. This also arises due to reluctance forces acting to reduce the bias flux reluctance path. An analogous restoring torque is produced when the rotor is perturbed in the $\theta_X$ direction.

In general, reluctance forces can be proportional to the square of the air gap flux density. Thus, by increasing the air gap bias flux density, the axial and tilt passive stiffnesses in a slice motor can be increased.

Figure 6:
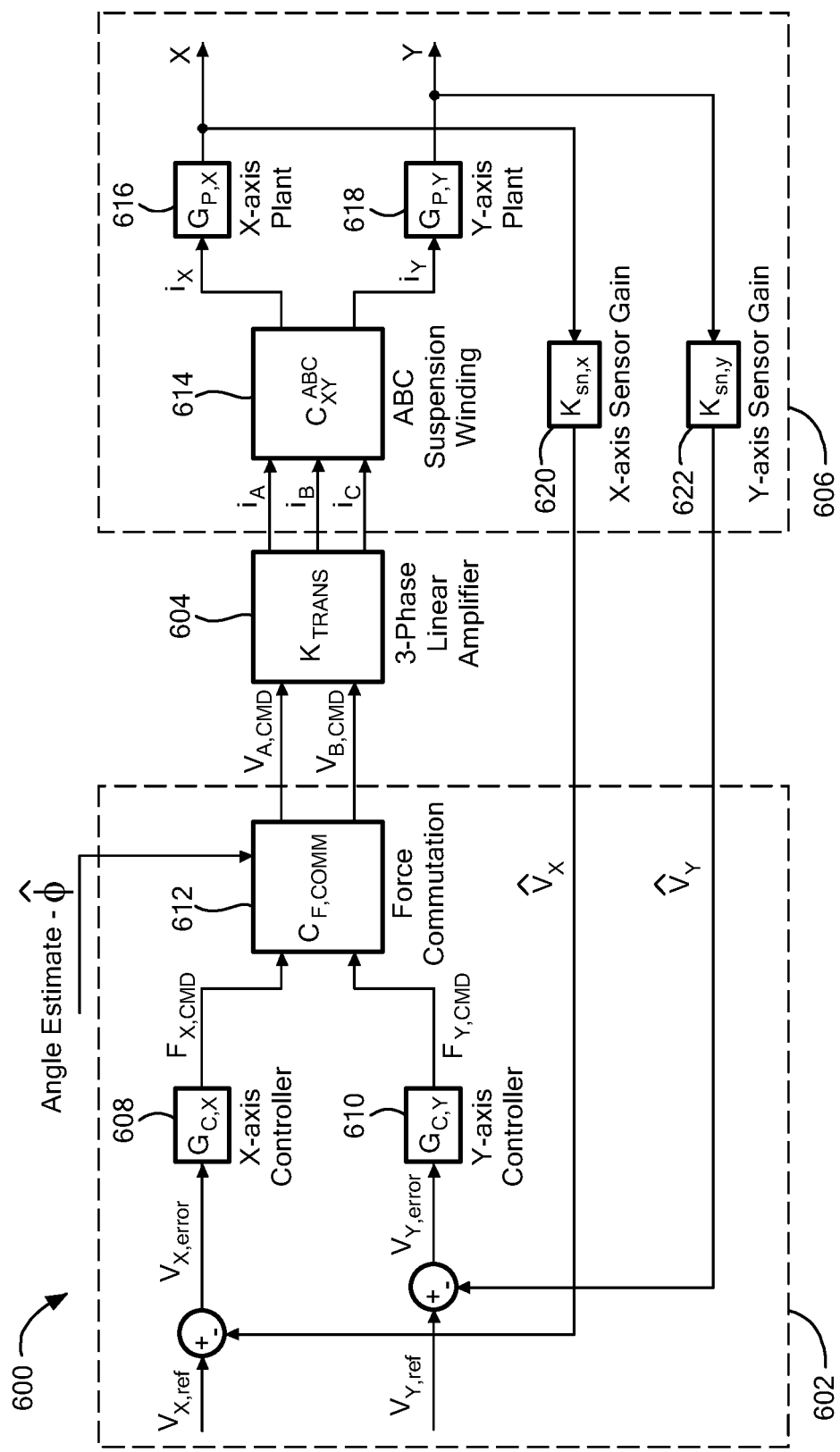
FIG. 6 is a diagram of a suspension control and commutation subsystem connected to a bearingless dipole IPM motor, according to embodiments of the present disclosure.
Figure 7:
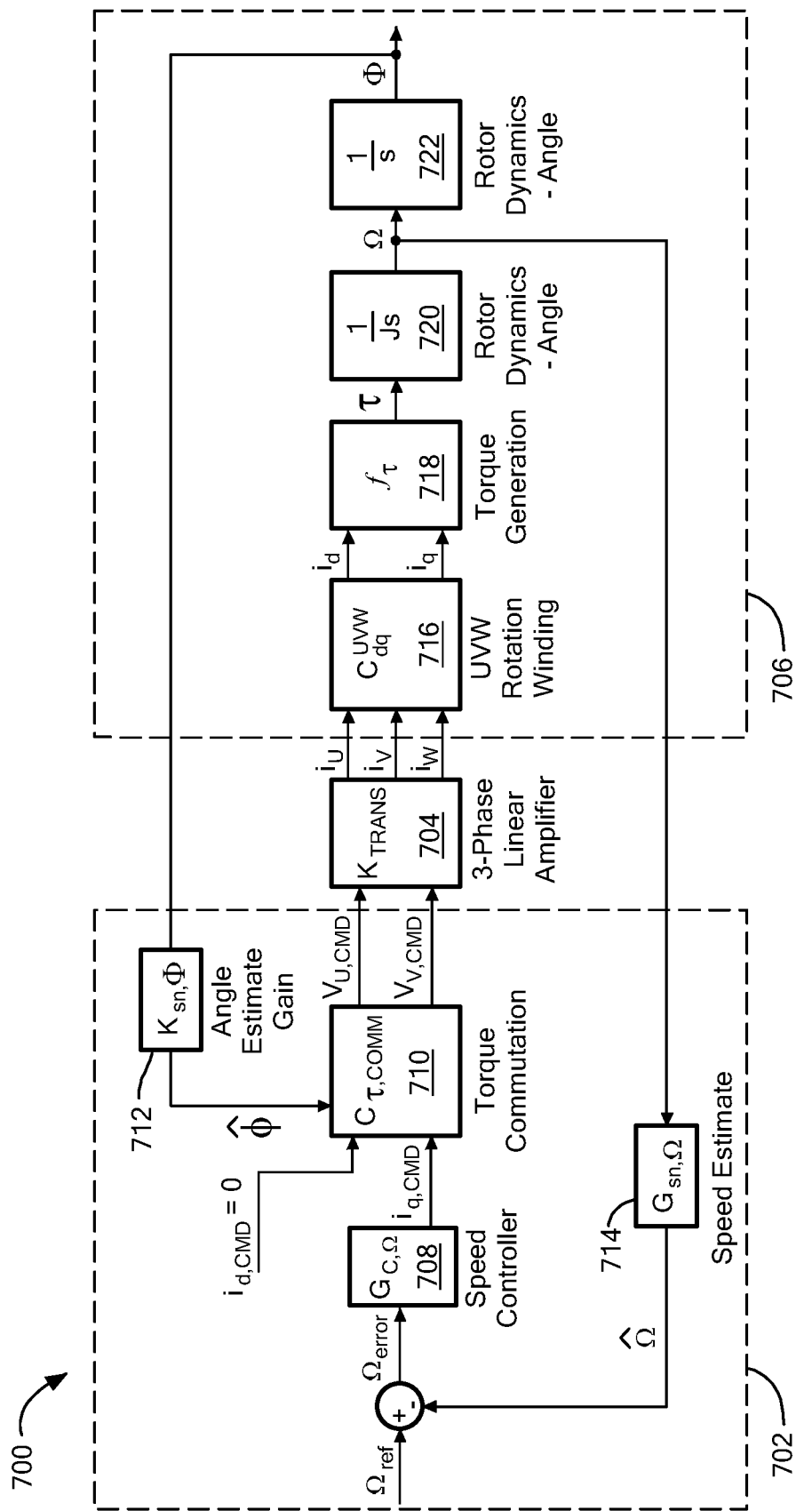
FIG. 7 is a diagram of a speed control and commutation subsystem connected to a bearingless dipole IPM motor, according to embodiments of the present disclosure.

Turning to FIGS. 6 and 7, the design and implementation of the force and torque commutation algorithms for a segmented dipole IPM bearingless motor are now described. A force commutation algorithm may be implemented within a motor system to decouple the radial forces (X and Y) from the rotor angle, allowing simple single-input single-output (SISO) controllers to be used to stabilize each radial degree of freedom. Similarly, a torque commutation algorithm can be implemented to decouple the torque generation from the rotor angle.

Figure 6A:
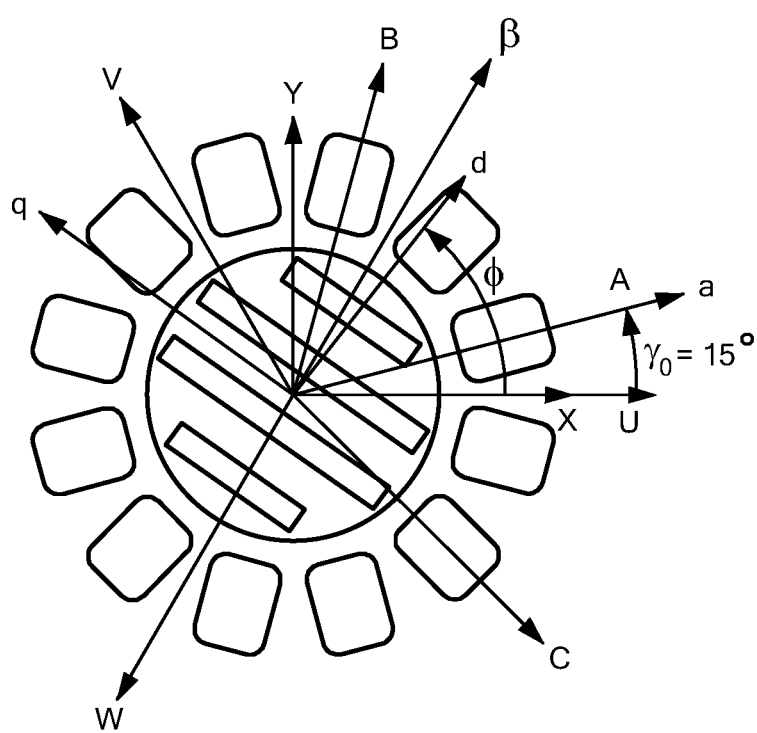
FIG. 6A is a schematic diagram showing reference frames that can be used within suspension and speed controllers, according to embodiments of the present disclosure.

To aid in understanding the commutation algorithms, several reference frames may be defined as shown in FIG. 6A. A stator fixed XY-frame can be defined to designate the convention for positive radial forces and motions. An ABC-frame is a stator-fixed frame that designates the magnetic axes of the three-phase, four-pole suspension winding. The A-axis can be aligned with stator tooth one, 15 mechanical degrees advanced of the X-axis. The B and C-axes can be oriented ±60 mechanical degrees from the A-axis, which equates to ±120 electrical degrees with respect to the four-pole suspension winding. An $\alpha\beta$-frame is a stator-fixed frame that designates the magnetic axes of an equivalent two-phase representation of the three-phase, four-pole suspension winding. Here, the $\alpha$-axis is aligned with the A-axis. The $\beta$-axis is 45 mechanical degrees (90 electrical degrees) advanced of the a-axis. This equivalent two-phase winding can assist with understanding the commutation. An UVW-frame is another stator-fixed frame, which designates the magnetic axes of the three-phase, two-pole rotation winding. Here, the U-axis can be aligned with the X-axis, and the V and W-axes can be oriented ±120 mechanical degrees from the U-axis. With respect to the two-pole winding, the electrical and mechanical angles may be equivalent. As previously mentioned, a rotor-fixed dq-frame can also be defined. The direct or d-axis can point along the north pole of the rotor's axis of magnetization and the quadrature or q-axis can be 90 mechanical degrees advanced relative to the direct axis. The rotor angle $\phi$ can be defined as the mechanical angle between the rotor direct axis and the stator-fixed X-axis.

FIG. 6 shows an example of a motor system 600 having a suspension control and commutation subsystem 602 connected to a bearingless dipole IPM motor 606 via power electronics 604. A feedback loop may be provided between the motor 606 and subsystem 602, as shown. The subsystem 602, power electronics 604, and motor 606 may be the same as or similar to components 102a/102c, 104, and 106 of FIG. 1 respectively. In some embodiments, power electronics 604 can include a 3-phase linear amplifier.

Subsystem 602 can include an X-axis control unit 608, a Y-axis control unit 610, and a force commutation unit 612. Control units 608, 610 can include hardware and/or software configured to calculate the required stator current commands to stabilize the radial degrees of freedom and keep the rotor levitated in the center of the stator bore.

Motor 606 can include suspension windings 614, an X-axis sensor system modeled as a gain $K_{sn,x}$ 620, and a Y-axis sensor modeled as a gain $K_{sn,y}$ 622. Blocks 616 and 618 represent the X-axis and Y-axis rotor suspension plant dynamics, respectively. In some embodiments, suspension windings 614 can include three-phase suspension windings. Motor 606 can include a position sensing system that measures the rotor radial and angular position, which are provided as feedback to the subsystem 602 as shown.

As mentioned above, force commutation is required to decouple the X and Y forces from the rotor angle such that an arbitrary radial force can be generated for an arbitrary instantaneous rotor angle. In the case where the flux distributions contain significant higher harmonics, or when the armature reaction flux from the rotation winding MMF is significant, more complex force commutation algorithms are required.

The force commutation algorithm can determine the required three-phase suspension winding current commands ($i_A$, $i_B$, and $i_C$) to generate radial forces given force commands $F_X$, $F_Y$ and rotor angle $\phi$. A simplified form of the decoupling force commutation is presented in Equation (5):

$$\begin{bmatrix} i_A \\ i_B \\ i_C \end{bmatrix} = \frac{1}{K_F}\sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos(\phi-\frac{\pi}{6}) & -\sin(\phi-\frac{\pi}{6}) \\ \sin(\phi-\frac{\pi}{6}) & \cos(\phi-\frac{\pi}{6}) \end{bmatrix} \begin{bmatrix} F_x \\ F_y \end{bmatrix}. \quad (5)$$

This algorithm can be understood by breaking it into a series of coordinate transformations between the reference frames shown in FIG. 6A. Given radial force commands $F_X$, $F_Y$ and rotor angle $\phi$, the radial forces are first transformed to the rotor fixed dq-frame:

$$\begin{bmatrix} F_d \\ F_q \end{bmatrix} = \begin{bmatrix} \cos\phi & \sin\phi \\ -\sin\phi & \cos\phi \end{bmatrix} \begin{bmatrix} F_x \\ F_y \end{bmatrix}. \quad (6)$$

Next, the dq-frame forces are converted to dq-frame suspension currents:

$$\begin{bmatrix} i_{Fd} \\ i_{Fq} \end{bmatrix} = \begin{bmatrix} 1/K_{f,d} & 0 \\ 0 & 1/K_{f,q} \end{bmatrix} \begin{bmatrix} F_d \\ F_q \end{bmatrix}. \quad (7)$$

Here, $1/K_{f,d}$ and $1/K_{f,q}$ are the inverse motor force constants along the d and q axes, in units of A/N. From here, a transformation can be performed from the dq-frame currents to the equivalent two-phase $\alpha\beta$ suspension winding frame currents:

$$\begin{bmatrix} i_\alpha \\ i_\beta \end{bmatrix} = \begin{bmatrix} \cos(p_s(\phi-\frac{\pi}{12})) & -\sin(p_s(\phi-\frac{\pi}{12})) \\ \sin(p_s(\phi-\frac{\pi}{12})) & \cos(p_s(\phi-\frac{\pi}{12})) \end{bmatrix} \begin{bmatrix} i_{Fd} \\ i_{Fq} \end{bmatrix}. \quad (8)$$

Here, the parameter $p_s$ is the suspension winding pole pair number ($p_s=n_{p_s}/2=2$), and the phase offset $\pi/12$ is due to the offset between the rotor angle origin (the X-axis) and the $\alpha$-axis. Finally, the two-phase $\alpha\beta$ currents are converted to the three-phase ABC-frame with:

$$\begin{bmatrix} i_A \\ i_B \\ i_C \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_\alpha \\ i_\beta \end{bmatrix}. \quad (9)$$

This transformation is known as the power-invariant Clarke transformation and has been used in both analysis and commutation of three-phase systems. Combining Equations (6)-(9), the commutation algorithm can be represented as:

$$\begin{bmatrix} i_A \\ i_B \\ i_C \end{bmatrix} = C_{ABC}^{\alpha\beta} C_{\alpha\beta}^{dq} K_{F,dq}^{-1} C_{dq}^{XY} \begin{bmatrix} F_x \\ F_y \end{bmatrix}. \quad (10)$$

Here, each variable in the form $C_{(i)}^{(j)}$ represents a coordinate transformation matrix from frame j to frame i. The parameter $K_{F,dq}^{-1}$ is a 2-by-2 matrix containing the dq-frame inverse force constants $1/K_{f,d}$ and $1/K_{f,q}$ along the diagonal. To simplify the algorithm, it can be assumed the d and q-axis force constants are equivalent $1/K_F=1/K_{f,d}=1/K_{f,q}$ and this constant term can be moved to the front of the expression:

$$\begin{bmatrix} i_A \\ i_B \\ i_C \end{bmatrix} = \frac{1}{K_F} C_{ABC}^{\alpha\beta} C_{\alpha\beta}^{dq} C_{dq}^{XY} \begin{bmatrix} F_x \\ F_y \end{bmatrix}. \quad (11)$$

By multiplying the matrices $C_{\alpha\beta}^{dq} C_{dq}^{XY}$ and simplifying, Equation (11) can be shown to be equivalent to the simplified form of the commutation algorithm given in Equation (5). These equations may correspond to a commutation algorithm implemented within force commutation unit 612.

In some embodiments, the suspension commutation algorithm can be implemented using fixed-point arithmetic and executed in a loop running on a field programmable gate array (FPGA). Fixed-point values throughout the computation can be maintained as 27-bit words, of which 5-bits are used to represent the integer value to the left of the decimal point. The resulting current command fixed-point values can then be truncated to 20-bit total word length, 5-bit integer values prior to the digital-to-analog converter.

In some embodiments, to reduce the computing and resource requirements of the FPGA, the force constant $K_F$ can be excluded in the computation. Instead, this gain can be accounted for in the suspension control algorithm, discussed below. In some embodiments, the resource requirements of the FPGA can be reduced by only calculating $i_A$ and $i_B$. This is because, in some embodiments, the power electronics 604 only require two of the three phase current commands as inputs, with the third ($i_C$) calculated based on the balanced current constraint.

Described next are designs and implementations of a suspension control algorithm. Closed-loop feedback control of the radial degrees of freedom (X and Y) is required for stable levitation due to the negative stiffness that arises from the bias flux.

Referring still to FIG. 6, the operating principle of the motor system 600 can be understood by tracing the signals from left to right. Rotor position errors the along X and Y axes ($V_{X,error}$, $V_{Y,error}$) can be computed by subtracting the position estimates ($\hat{V}_X$, $\hat{V}_Y$) from reference position commands ($V_{X,ref}$, $V_{Y,ref}$). To keep the rotor centered within the stator bore, the rotor reference commands can be nominally set to zero. The position estimates, errors, and reference commands are in units of volts, rather than units of length. This is because the position sensing system converts the position to a voltage with gains ($K_{sn,X}$, $K_{sn,Y}$) which have units of V/mm. The position errors are each fed into a single-input single-output (SISO) control units 608, 610 which generate X and Y force commands ($F_{X,CMD}$, $F_{Y,CMD}$). The force commands, along with the current rotor angle estimate $\hat{\phi}$, are then fed into the force commutation unit 612, which is discussed above.

The force commutation unit 612 can generate two command voltages ($V_{A,CMD}$, $V_{B,CMD}$) which are proportional to the desired suspension winding phase A and phase B currents. The voltage commands are sent to power electronics 604, which calculates the phase C command based on the balanced current constraint, scales the voltage commands by the transconductance gain $K_{TRANS}$=1A/V, and drives the suspension windings 614 with currents $i_A, i_B, i_C$. For clarity, suspension windings 614 are illustrated with transformation matrix $C_{ABC}{}^{XY}$ which converts the ABC-frame currents to equivalent XY-frame currents, as shown in Equation (12). This is equivalent to the Clarke transform with an additional π/12 rotation due to the offset between the ABC winding and X-axis.

$$C_{XY}^{ABC} = C_{XY}^{dq} C_{dq}^{\alpha\beta} C_{\alpha\beta}^{ABC} = \begin{bmatrix} \sin(\phi + \frac{\pi}{3}) & -\cos(\phi + \frac{\pi}{6}) & -\sin(\phi) \\ \cos(\phi + \frac{\pi}{3}) & \sin(\phi + \frac{\pi}{6}) & -\cos(\phi) \end{bmatrix} \quad (12)$$

The X and Y currents ($i_X$, $i_Y$) interact with the rotor suspension plant dynamics 616, 618. The plant dynamics can be modeled as a second order system with force constant $K_{F,X/Y}$, mass m, and negative stiffness $K_{n,X/Y}$:

$$G_{P,X}(s) = \frac{K_{FX}}{ms^2 - K_{n,X}}, \quad (13)$$

$$G_{P,Y}(s) = \frac{K_{FY}}{ms^2 - K_{n,Y}}. \quad (14)$$

This interaction results in radial motions X and Y which are sensed and scaled by the position sensing system and fed back into the control units 608, 610. To illustrate the decoupling effect of the force commutation, it can be noted that the product of the force commutation $G_F$, linear amplifier transconductance gain $K_{TRANS}$, and ABC suspension winding reference frame transformation $C_{XY}{}^{ABC}$ simplifies to the identity matrix with constant scale factor:

$$C_{XY}^{ABC} K_{TRANS} C_{F,COMM} = \sqrt{\frac{3}{2}} \begin{bmatrix} 1 & 0 \\ 0 & 1 \end{bmatrix}. \quad (15)$$

As a result, the X-axis force commands will in principle result in pure X-axis current and the Y-axis force commands will result in pure Y-axis current, scaled by a gain of $\sqrt{3/2}$. While there may be some residual coupling in the motor plants due to non-ideal flux distributions, for modeling and control design purposes it can be assumed that the force commutation algorithm $G_F$ perfectly decouples the X and Y suspension loops. With this assumption, described next is a design of a single input single output (SISO) controller to stabilize the radial degrees of freedom.

In some embodiments, the suspension controller may be designed using frequency domain loop shaping techniques such that the loop return ratio achieves one or more of the following design goals:

TABLE 1

| Parameter | Value |
|---|---|
| $f_c$ | 200 Hz |
| $\phi_{PM}$ | ≥50° | where $f_c$ is the loop return ratio crossover frequency and $\phi_{PM}$ is the loop return ratio phase margin.

In some embodiments, the suspension controller used for both the X and Y axes make have the form shown in Equation (16). That is, Equation (16) or a similar equation can be implemented within both X-axis control unit 608 and Y-axis control unit 610. In some embodiments, the numerical values of Table 2 can be used in implementing this controller. The controller of Equation (16) can achieve the design goals specified in Table 1. In some embodiments, a suspension control algorithm according to the present disclosure can be designed using frequency domain loop shaping techniques to achieve desired parameters.

$$G_C(s) = K_P \frac{\alpha \tau s + 1}{\frac{s^2}{\omega_0^2} + \frac{2\zeta s}{\omega_0} + 1}. \quad (16)$$

TABLE 2

| Parameter | Value |
|---|---|
| $K_p$ | 2.4418 |
| α | 6 |
| τ | 3.24249e-4 sec |
| $\omega_0$ | 6156 rad/sec |
| ζ | 0.7071 V/m |

The suspension control algorithm(s) can be implemented using fixed-point arithmetic executed on a FPGA. The fixed-point values throughout the computation can be maintained as 27-bit words, of which 5-bits are used to represent the integer value to the left of the decimal point. In the case of a digital implementation, the continuous time controller $G_C(s)$ can be converted to an equivalent discrete time controller $G_C(z)$. For example, the continuous-time controller implementation $G_C(s)$ with parameters $K_p$, α, σ, $\omega_0$, and ζ and can be converted to the discrete time implementation $G_C(z)$ using a backward Euler transformation.

FIG. 7 shows an example of a motor system 700 having a speed control and commutation subsystem 702 connected to a bearingless dipole IPM motor 706 via power electronics 704. One or more feedback loops may be provided between the motor 706 and subsystem 702, as shown. The subsystem 702, power electronics 704, and motor 706 may be the same as or similar to components 102b/102d, 104, and 106 of FIG. 1 respectively. In some embodiments, power electronics 704 can include a 3-phase linear amplifier.

Subsystem 702 can include a speed control unit 708, a torque commutation unit 710, an angle sensor modeled as a gain $K_{sn,\phi}$ 712, and speed estimate unit 714. Motor 706 includes a rotation winding 716, a steel stator structure, and a dipole IPM rotor. The rotor dynamics are modeled by a torque generation block 718, a rotor speed block 720, and a rotor angle block 722. In some embodiments, rotation windings 716 can include three-phase suspension windings.

Torque commutation unit 710 can be configured to calculate stator current commands to rotate the rotor. A torque commutation algorithm be implemented to decouple the torque generation from the rotor angle. In some embodiments, current commands can be specified in the rotor-fixed dq-frame described above in the context of FIG. 6A. This simplifies the torque current relationship such that the torque is independent of the rotor angle. Torque commutation can utilize field-oriented control (FOC) or vector control. The torque commutation algorithm can determine the three-phase rotation winding currents ($i_U$, $i_V$, and $i_W$) applied to rotation windings 716 given dq-frame current commands ($i_d$ and $i_q$) and rotor angle $\phi$. In some embodiments, the algorithm used may have the form of Equation (17).

$$\begin{bmatrix} i_U \\ i_V \\ i_W \end{bmatrix} = \sqrt{\frac{2}{3}} \begin{bmatrix} \cos(\phi) & -\sin(\phi) \\ \cos\left(\phi - \frac{2\pi}{3}\right) & -\sin\left(\phi - \frac{2\pi}{3}\right) \\ \cos\left(\phi + \frac{2\pi}{3}\right) & -\sin\left(\phi + \frac{2\pi}{3}\right) \end{bmatrix} \begin{bmatrix} i_d \\ i_q \end{bmatrix}. \quad (17)$$

As with the force commutation algorithm, the torque commutation algorithm can be understood as a series of coordinate transformations between the reference frames of FIG. 6A. First, the dq-frame currents can be transformed to the stator-fixed XY-frame:

$$\begin{bmatrix} i_{X,r} \\ i_{Y,r} \end{bmatrix} \begin{bmatrix} \cos p_r\phi & -\sin p_r\phi \\ \sin p_r\phi & \cos p_r\phi \end{bmatrix} \begin{bmatrix} i_a \\ i_q \end{bmatrix}. \quad (18)$$

This transformation is known as the inverse Park transform. The variable $P_r$ is the pole pair number of the rotation winding, which can be one (1). Next, the three-phase rotation winding currents can be calculated by converting from dq-frame to the UVW frame using the power invariant inverse Clarke transform:

$$\begin{bmatrix} i_U \\ i_V \\ i_W \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{X,r} \\ i_{Y,r} \end{bmatrix}. \quad (19)$$

Combining Equations (18) and (19) yields the full torque commutation equation of Equation (17). This algorithm can be implemented using fixed-point arithmetic and executed in a loop running on a FPGA. The fixed-point values throughout the computation can be maintained as 25-bit words, of which 5-bits are used to represent the integer value to the left of the decimal point. The resulting current command fixed-point values can be truncated to 20-bit total word length, 5-bit integer values prior to the digital-to-analog converter. As with the force commutation algorithm, the computation can be simplified by only calculating the first two phase commands ($i_u$ and $i_v$). The third command is computed by the power electronics 704 due to the balanced current constraint.

Described next are designs and implementations of a speed/rotation control algorithm. In some embodiments, open-loop current control operation can be used. In other embodiments, closed-loop speed control operation can be used (with FIG. 7 showing a closed-loop arrangement). While the rotational degree of freedom is open-loop stable, closed-loop speed control may be preferable for pumping applications. In both of these operating modes, the suspension control system previously described can operate in parallel with the speed control such that the rotor is levitated and centered within the stator. However, to aid in understanding, the following discussion may treat the torque and suspension systems as being decoupled.

For open-loop operation, the rotor speed $\Omega$ can be controlled by direct and quadrature axis current commands ($i_{d,CMD}$, $i_{q,CMD}$) with no angle or speed feedback except that required for the commutation. The open-loop currents commands, along with the current rotor angle estimate $\hat{\phi}$ are input to the torque commutation algorithm $C_{\tau,COMM}$ described by Equation (17).

The torque commutation algorithm can generate two command voltages ($V_{U,CMD}$, $V_{v,CMD}$) proportional to desired rotation winding phase U and phase V currents. The voltage commands are sent to power electronics (e.g., linear amplifier), which calculates the phase W command based on the balanced current constraint, scales the voltage commands by the transconductance gain $K_{TRANS}$=1A/V, and drives the three-phase rotation windings with currents $i_U$, $i_V$, and $i_W$. For convenience, the following transformation can be made from the UVW-frame back to the to the dq-frame:

$$C_{dq}^{UVW} = \begin{bmatrix} \cos\phi & \cos\left(\phi - \frac{2\pi}{3}\right) & \cos\left(\phi - \frac{2\pi}{3}\right) \\ -\sin\phi & \sin\left(\phi - \frac{2\pi}{3}\right) & -\sin\left(\phi + \frac{2\pi}{3}\right) \end{bmatrix}. \quad (20)$$

The net effect of the torque commutation algorithm, linear amplifier, and three phase windings is a $$\sqrt{\frac{3}{2}}$$

amplification of the direct and quadrature axis current commands, as shown by the matrix multiplication below:

$$C_{dq}^{UVW} K_{TRANS} C_{\tau,COMM} = \sqrt{\frac{3}{2}} \begin{bmatrix} 1 & 0 \\ 0 & 1 \end{bmatrix}. \quad (21)$$

The rotation winding currents can generate a two-pole flux distribution which interacts with the bias flux distribution and generates torque on the rotor. The torque generation as function of the direct and quadrature axis currents is presented here:

$$f_\tau(i_a, i_q) = q p_r \lambda_{PM} i_q - q p_r (L_q - L_d) i_d i_q. \quad (22)$$

Given torque $\tau$ on the rotor, the rotational speed $\Omega$ and rotor angle $\phi$ can be determined by repeated integration of the equation of motion:

$$\alpha = \frac{\tau}{J}, \quad (23)$$

$$\Omega = \frac{\alpha}{s}, \quad (24)$$

-continued $$\phi = \frac{\Omega}{s}. \quad (25)$$

Here, α is the angular acceleration of the rotor, and J is the moment off inertia of the rotor about the Z-axis. Modeling the rotor as a cylinder with mass m and radius r, the moment of inertia is given by:

$$J = \frac{1}{2}mr^2. \quad (26)$$

The rotor angle can be estimated from Hall element ring PCB signals and routed to the torque commutation unit and a force commutation unit (e.g., unit 612 of FIG. 6). The angle estimate gain unit can have a unity gain ($K_{sn,\phi}=1$). While the rotor rotation is stable with this open-loop operating mode, the system is unable to reject torque disturbances. With a constant current command, the rotor speed will vary in response to torque disturbances arising from cogging, force/torque coupling, and fluid dynamic forces during pumping, among others. Thus, a closed-loop speed control operating mode can be used, as described next.

As shown in FIG. 7, in a closed-loop operating mode, a speed control unit 708 ($G_{C,\Omega}$) can be configured to compute the required current to drive the rotor at a commanded reference speed $\Omega_{ref}$. The input to the speed control unit 708 is the speed error $\Omega_{error}$, which is computed as the difference in the speed reference command and speed estimate $\hat{\Omega}$. The speed estimate can be computed from the angle estimate. The speed estimate can be filtered with a digitally implemented fourth order low-pass Butterworth filter with a desired cutoff frequency (e.g., 200 Hz) prior to feeding it back for the error computation. This filter is represented with the transfer function $G_{sn,\Omega}$ in FIG. 7. The speed control unit 7108 computes the q-axis current command $i_{q,CMD}$ based on the error input. The direct axis current command $i_{d,CMD}$ is set to zero. With $i_{d,CMD}=i_d=0$, the torque generation equation $f_\alpha$ simplifies to:

$$f_\tau(i_d, i_q) = qp_r\lambda_{PM}i_q. \quad (27)$$

With $i_d=0$, it can be seen that only permanent magnet torque is generated. In some embodiments, a speed control algorithm can take advantage of the hybrid torque production capabilities of IPM motors, where both permanent magnet torque and reluctance torque can be generated by commanding direct and quadrature axis currents. Operating in hybrid torque production mode may require an additional algorithm to calculate the optimal direct and quadrature axis currents to generate a desired torque. In some embodiments, this additional algorithm can be excluded by designing the controller such that it only generates quadrature axis current commands. Torque generation Equation (27) can be further simplified:

$$f_\tau(i_d, i_q) = K_{T,PM}i_q. \quad (28)$$

Here, $K_{T,PM}$ is the rotor permanent magnet torque constant, or equivalently, the amount of torque produced per unit quadrature axis current. This differs from the torque constant values that can be calculated from the maximum torque that occurred when sweeping the commutation angle from π/2 to 3π/4.

Beyond the addition of the speed controller $G_{C,\Omega}$ and the calculation of the speed error, the rest of the system operating principle may be largely the same as was described for the open-loop rotation operating mode. To design the speed control unit 708, an loop shaping approach can be used similar to that described above for the suspension control system. The following design goals can be set for the controller:

TABLE 3

| Parameter | Value |
|---|---|
| $f_c$ | 50 Hz |
| $\phi_{PM}$ | ≥30° |

An illustrative proportional controller may be designed as follows to meet the crossover and phase margin requirements of Table 3.

$$G_{C,\Omega} = K_{P,\Omega} = 0.17. \quad (29)$$

The performance of the system can be further improved by including an integral term in the controller. With this, the steady state speed error will be driven to zero. Closed-loop speed can be implemented using fixed-point arithmetic on a FPGA. The proportional gain can be implemented as a 16-bit word, of which 3-bits are used to represent the integer value. The speed error can be implemented as a 16-bit word, of which a 12-bits are used to represent the integer value. The proportional controller can be implemented as a multiplication block. Additionally, a controller enable button may be included to allow a user to toggle between the open-loop current and closed-loop speed control modes.

Referring generally to FIGS. 8-12, disclosed embodiments address four issues found in prior art bearingless motors: force vs. torque trade-off, asymmetric suspension dynamics, lack of hybrid torque production capability, and complex and expensive manufacturing.

Figure 8:
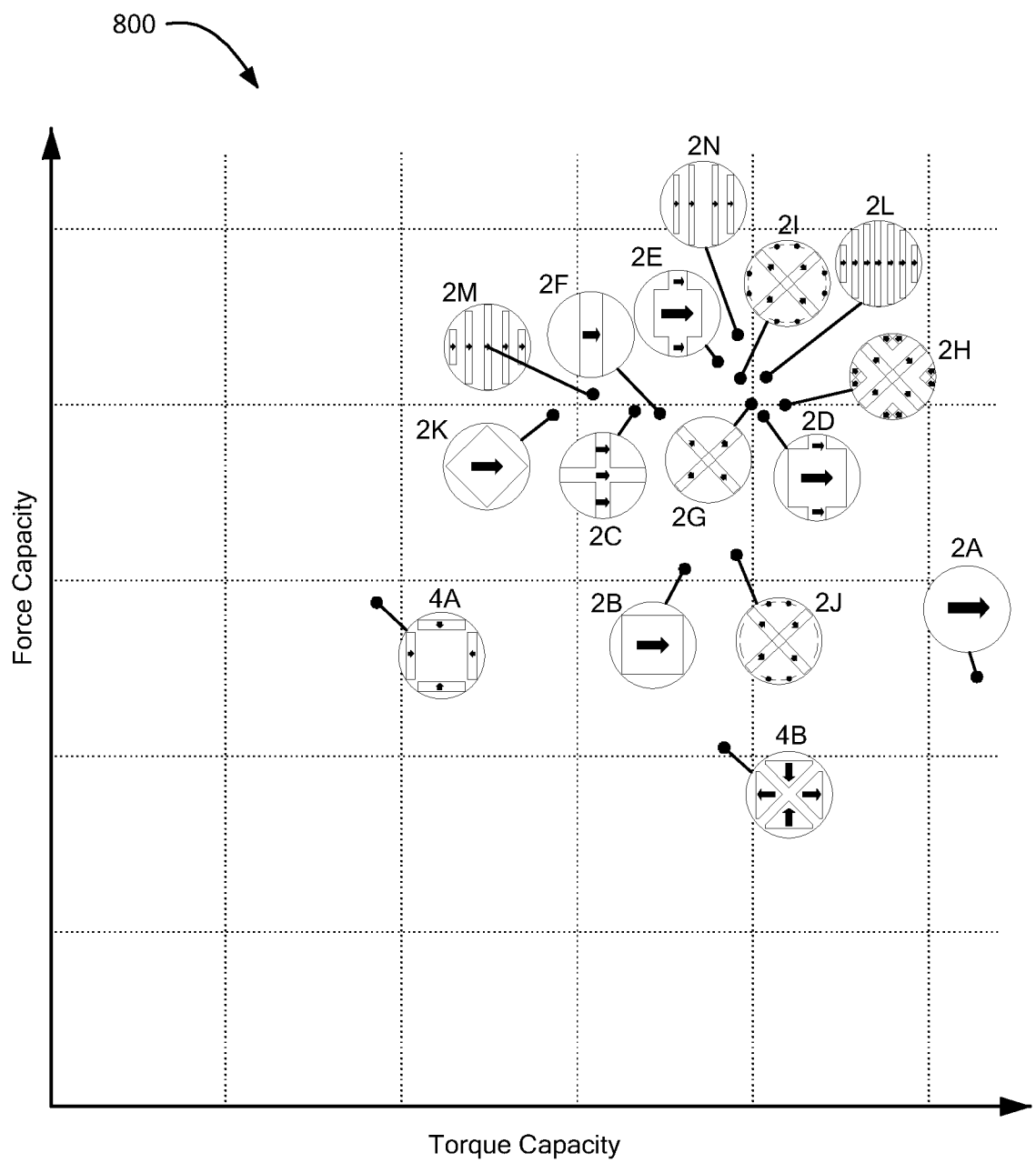
FIG. 8 is a chart comparing force and torque capacity of several rotor designs including embodiments of dipole IPM slice rotors.

FIG. 8 shows a chart 800 comparing force and torque capacity of several rotor designs including embodiments of dipole IPM slice rotors. Dipole IPM rotors disclosed herein can provide low reluctance local flux paths for a portion of the four-pole suspension flux. Because the suspension flux need not flow through all of the magnets, the magnet thickness has less of an effect on the force capacity. As a result, the tradeoff between force and torque capacity may be less significant with disclosed rotor designs. This allows high performance rotor designs which can simultaneously achieve high force and torque capacities. As shown by chart 800, salient pole dipole IPM designs 2B-2N exhibit a good balance of force and torque capacity evidenced by their location in the upper right quadrant of the chart.

Figure 9:
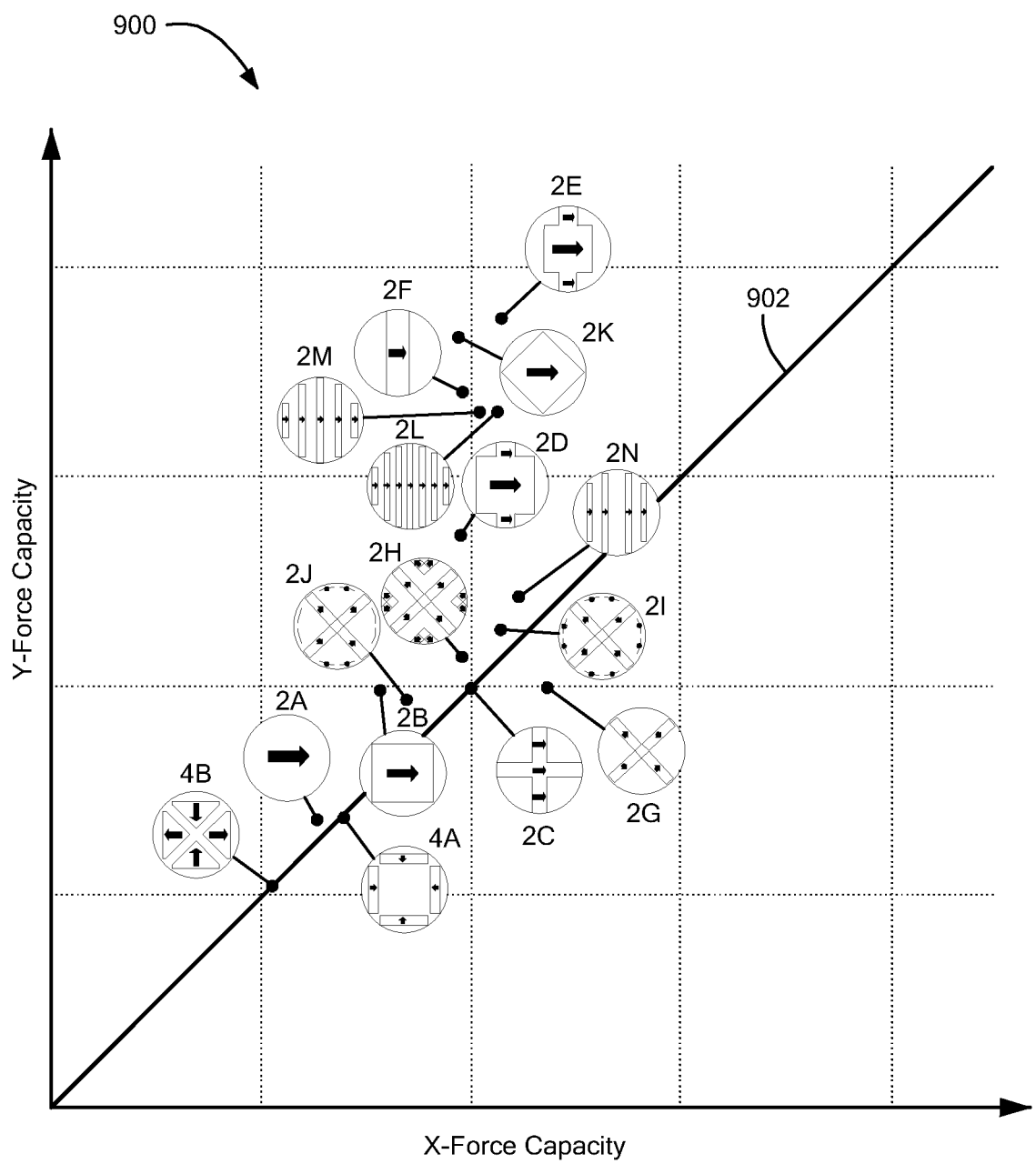
FIG. 9 is a chart comparing X and Y force capacities of several rotor designs including embodiments of dipole IPM slice rotors.

Turning to FIGS. 8 and 9, prior art IPM designs may exhibit asymmetry in the suspension dynamics, meaning different dynamic properties for motions along the X and Y axes. Asymmetric dynamics require more complicated controller structures and commutation algorithms to achieve stable levitation. Asymmetric suspension dynamics can arise from asymmetric rotor flux patterns, stator flux patterns, and flux reluctance paths. While disclosed embodiments may show some level of asymmetry in the flux patterns and reluctance paths, the interaction of the three results in relatively symmetric dynamics. It has been demonstrated through experiments that the prototype segmented dipole IPM dynamics are symmetric enough to achieve stable levitation with a simple control and commutation structure.

Another issue found in prior art bearingless IPM rotors is the lack of salient poles. Without salient poles, a bearingless IPM may not have the advantages that are typical of most non-bearingless IPM motors with salient poles. These advantages include hybrid torque production and flux weakening capability. The salient poles result in higher reluctance paths along the rotor axis of magnetization (equivalently, the d-axis), and lower reluctance paths perpendicular to the axis of magnetization (equivalently, the q-axis). By properly commanding the stator currents, an air gap flux can be generated that interacts with rotor flux and saliency to produce both permanent magnet torque and reluctance torque. Also, by commanding a negative d-axis current, the back-EMF can be reduced, enabling operation above the motor's rated speed in a constant power regime. This is sometimes referred to as flux-weakening.

FIG. 9 shows a chart 900 comparing X and Y force capacities of several rotor designs including embodiments of dipole IPM slice rotors. Salient pole dipole IPM designs 2C, 2H, 2I, 2J, and 2N exhibit fairly symmetric X and Y force capacities evidence by their proximity to the unity slope line 902.

Figure 10:
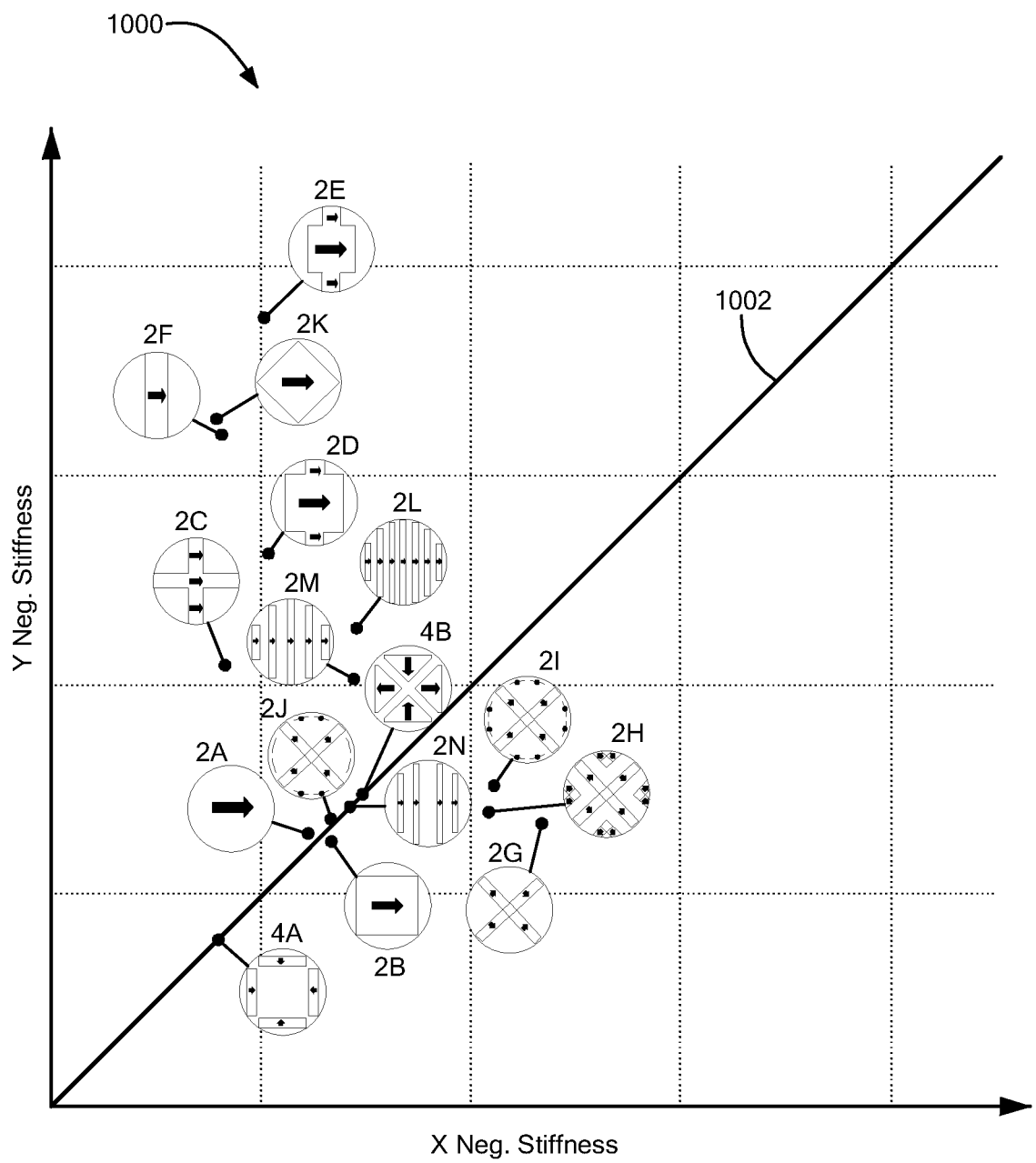
FIG. 10 is a chart comparing X and Y negative stiffnesses of several rotor designs including embodiments of dipole IPM slice rotors.

FIG. 10 shows a chart 1000 comparing X and Y negative stiffnesses of several rotor designs including embodiments of dipole IPM slice rotors. Salient pole dipole IPM designs 2J and 2N exhibit fairly symmetric X and Y negative stiffnesses evidence by their proximity to the unity slope line 1002.

Referring generally to FIGS. 11A, 11B, 12A, and 12B, disclosed rotor embodiments may be simple and low-cost to manufacture as compared to prior art designs.

Figure 11A:
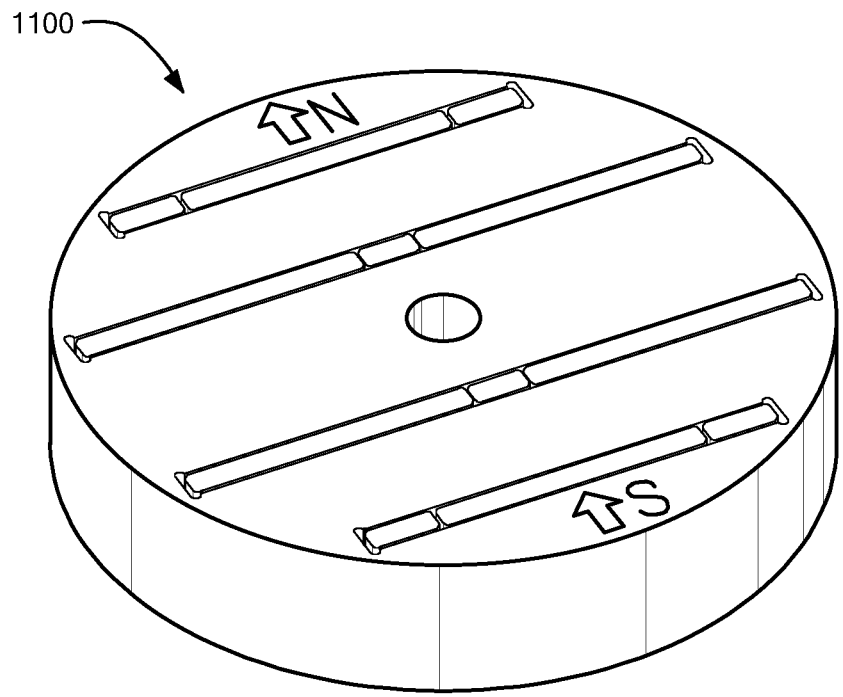
FIG. 11A is a perspective view photograph of a segmented dipole IPM rotor, according to embodiments of the present disclosure.
Figure 11B:
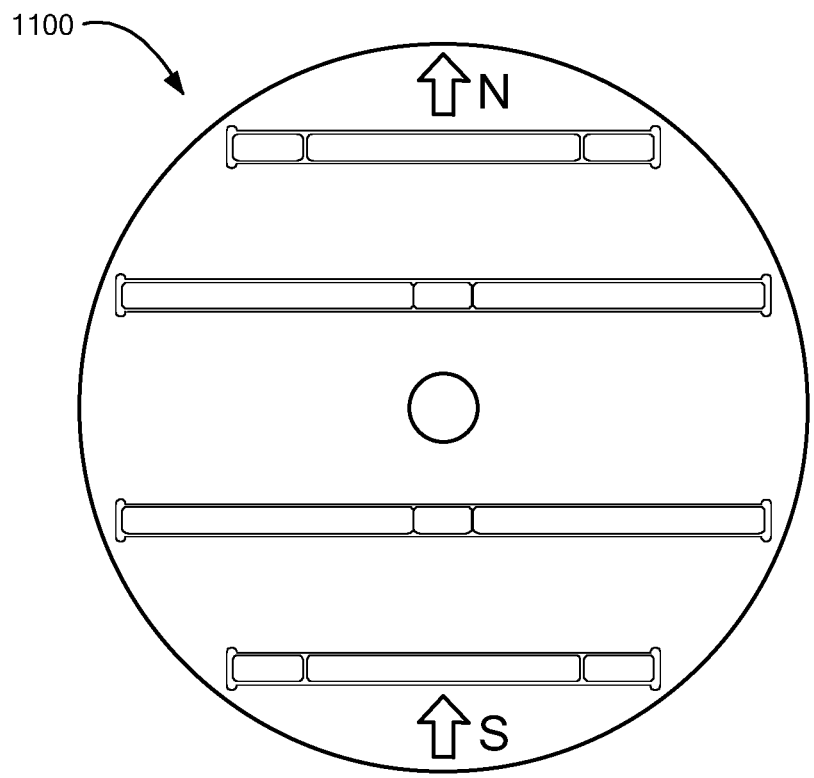
FIG. 11B is a top view photograph of the segmented dipole IPM rotor of FIG. 11A.

Referring to FIGS. 11A and 11B, according to some embodiments, a segmented dipole IPM rotor 1100 can be constructed from a stack of electrical steel laminations. The individual laminations may be cut from thin sheets of electrical steel. This step can be done with several methods, including laser cutting, stamping, and wire-EDM. In some embodiments, the sheets can be provided as 24 Gauge (0.025") sheets. Each lamination layer can have the same pattern of cutouts for the permanent magnets. Once the laminations are cut, they can be stacked using a fixture to align the magnet cut-out patterns. Then, the laminations can be bonded with epoxy or varnish. Once the lamination stacks are assembled, permanent magnets can be inserted into the slots and epoxy is applied to prevent them from coming dislodged during operation or handling. In some embodiments, standard, rectangular magnets can be used.

FIGS. 12A and 12B show an example of a segmented dipole IPM rotor 1200. As shown in the side view of FIG. 12B, the rotor 1200 can be constructed from a stack of electrically insulated steel laminations (e.g., lamination 1202). The insulation between the thin laminations can provide a high resistance path for eddy currents induced by the stator flux, thus limiting the eddy current losses at higher speeds.

In the embodiment of FIG. 12A, each of the four magnet "segments" can be made of up three smaller permanent magnets, labeled "A" and "B." This allows us to use standard size, off-the-shelf permanent magnets as opposed to more expensive custom permanent magnets. In some embodiments, the six "A" magnets, exemplified by magnet 1204, can each dimensions of about 5 mm×10 mm×2 mm.

In some embodiments, the six "B" magnets, exemplified by magnet 1206, can each dimensions of about 20 mm×10 mm×2 mm.

To aid in manufacturing, a relief cut (e.g., relief cut 1208) can be made at each corner of the slots in the rotor laminations to prevent the finite radius corners of the permanent magnets from interfering with the finite radius slot corners. Additionally, a central bore 1210 sized for clearance with a screw (e.g., a 6-32 screw) can be provided in the rotor structure. This allows us to easily fixture the rotor for calibration and testing purposes.

The rotor dimensions can be selected to maintain a minimum material width (e.g., 0.75 mm) at the saturating magnet bridge locations (e.g., at location 1212). Magnetically, it is desirable to to minimize this bridge width to minimize the amount of flux that leaks through it. However, the bridge must be made sufficiently wide such that it remains structurally sound during manufacturing and motor operation.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A motor system comprising:
   a bearingless stator having a plurality of magnetic windings including rotation windings and suspension windings;
   a dipole interior permanent magnet (IPM) rotor positioned within the stator, the rotor having a plurality of permanent magnets disposed within a cylindrical structure;
   one or more position sensors to measure radial and angular position of the rotor;
   a controller configured to receive measurements from the one or more position sensors and to generate current commands for the stator; and
   power electronics to receive and amplify the current commands to excite the rotation windings to generate torque and to excite the suspension windings to stabilize the rotor within the stator.

2. The motor system of claim 1, wherein the controller comprises:
- a suspension control unit configured to generate first current commands for the stator which result in forces on the rotor to stabilize radial degrees of freedom and keep the rotor levitated in a center of the stator bore; and
- a speed control unit configured to generate second current commands for the stator to rotate the rotor.

3. The motor system of claim 1, wherein the plurality of magnetic windings of the stator produce four-pole suspension flux and two-pole rotation flux when excited.

4. The motor system of claim 1, wherein the permanent magnets are arranged to generate a dipole magnetic flux pattern in an air gap between the rotor and stator.

5. The motor system of claim 1, wherein the cylindrical structure of the rotor has a plurality of cut outs to receive the plurality of permanent magnets.

6. The motor system of claim 1, wherein the permanent magnets are encapsulated within the cylindrical structure of the rotor.

7. The motor system of claim 1, wherein the cylindrical structure of the rotor comprises steel.

8. A method comprising:
- obtaining one or more measurements of radial and angular position of a dipole interior permanent magnet (IPM) rotor using one or more position sensors, the rotor positioned within a bearingless stator having a plurality of magnetic windings including rotation windings and suspension windings, the rotor having a plurality of permanent magnets disposed within a cylindrical structure;
- generating current commands for the stator based on the one or more measurements;
- exciting the rotation windings using the current commands to generate torque; and
- exciting the suspension windings using the current commands to stabilize the rotor within the stator.

9. The method of claim 8, comprising amplifying the current commands using power electronics.

10. The method of claim 8, comprising:
- generating first current commands for the stator which result in forces on the rotor to stabilize radial degrees of freedom and keep the rotor levitated in a center of the stator bore; and
- generating second current commands for the stator to rotate the rotor.

11. The method of claim 8, wherein the plurality of magnetic windings of the stator produce four-pole suspension flux and two-pole rotation flux when excited.

12. The method of claim 8, wherein the permanent magnets are arranged to generate a dipole magnetic flux pattern in an air gap between the rotor and stator.

13. The method of claim 8, wherein the cylindrical structure of the rotor has a plurality of cut outs to receive the plurality of permanent magnets.

14. The method of claim 8, wherein the permanent magnets are encapsulated within the cylindrical structure of the rotor.

15. The method of claim 8, wherein the cylindrical structure of the rotor comprises steel.

* * * * *

UNITED STATES PATENT AND TRADEMARK OFFICE
CERTIFICATE OF CORRECTION

| | |
|---|---|
| PATENT NO. | : 11,368,116 B2 |
| APPLICATION NO. | : 17/331712 |
| DATED | : June 21, 2022 |
| INVENTOR(S) | : Trumper et al. |

It is certified that error appears in the above-identified patent and that said Letters Patent is hereby corrected as shown below:

On the Title Page

Item [54] and In the Specification, Column 1 Line 1 delete "Inferior" and replace with --Interior--.

Signed and Sealed this
Nineteenth Day of July, 2022

Katherine Kelly Vidal
*Director of the United States Patent and Trademark Office*